(12) United States Patent
Yemini et al.

(10) Patent No.: US 7,107,185 B1
(45) Date of Patent: Sep. 12, 2006

(54) APPARATUS AND METHOD FOR EVENT CORRELATION AND PROBLEM REPORTING

(75) Inventors: Yechiam Yemini, Cos Cob, CT (US); Shaula Alexander Yemini, Briarcliff Manor, NY (US); Shmuel Kliger, Chappaqua, NY (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/263,689

(22) Filed: Nov. 1, 2005

Related U.S. Application Data

(63) Continuation of application No. 11/034,192, filed on Jan. 12, 2005, now Pat. No. 7,003,433, which is a continuation of application No. 10/400,718, filed on Mar. 27, 2003, now Pat. No. 6,868,367, which is a continuation of application No. 09/809,769, filed on Mar. 16, 2001, now abandoned, which is a continuation of application No. 08/893,263, filed on Jul. 15, 1997, now Pat. No. 6,249,755, which is a continuation of application No. 08/679,443, filed on Jul. 12, 1996, now Pat. No. 5,661,668, which is a continuation of application No. 08/465,754, filed on Jun. 6, 1995, now abandoned, which is a continuation of application No. 08/249,282, filed on May 25, 1994, now Pat. No. 5,528,516.

(51) Int. Cl.
*G06F 17/00* (2006.01)

(52) U.S. Cl. .......... 702/183; 702/181; 702/185

(58) Field of Classification Search ........ 702/179–187, 702/58, 59, 126, 196, 119–123; 706/50–52, 706/59, 19–21, 61, 924, 920, 922
See application file for complete search history.

(56) References Cited

U.S. PATENT DOCUMENTS

| | | | | |
|---|---|---|---|---|
| 4,937,825 A | * | 6/1990 | Ballard et al. | 714/712 |
| 5,724,263 A | * | 3/1998 | Raguram et al. | 702/84 |
| 5,732,192 A | * | 3/1998 | Malin et al. | 703/2 |

OTHER PUBLICATIONS

Dupuy et al., "Design of the Netmate Network Management System", 1991 (no month), Elsevier Science Publishers B.V., pp. 639-650.*
Dupuy et al., "NETMATE: A Network Management Environment", Mar. 1991, IEEE Network Magazine, pp. 35-40 and 43.*
Yemini, "The OSI network management model", May 1993, IEEE Communications Magazine, vol. 31, issue 5, pp. 20-29.*

* cited by examiner

*Primary Examiner*—Hal Wachsman
(74) *Attorney, Agent, or Firm*—K. Gupta

(57) ABSTRACT

A computer implemented method on a computer readable media is provided for determining the source of a problem in a complex system of managed components based upon symptoms. The problem source identification process is split into different activities. Explicit configuration non-specific representations of types of managed components, their problems, symptoms and the relations along which the problems or symptoms propagate are created that can be manipulated by executable computer code. A data structure is produced for determining the source of a problem by combining one or more of the representations based on information of specific instances of managed components in the system. Computer code is then executed which uses the data structure to determine the source of the problem from one or more symptoms.

8 Claims, 17 Drawing Sheets

|    | 1 | 2 | 3 | 4 | 5 | 6 | 7 | 8 | 9 | 10 | 11 |
|----|---|---|---|---|---|---|---|---|---|----|----|
| 1  | 1 | 0 | 0 | 0 | 0 | 0 | 0 | 0 | 0 | 0  | 0  |
| 2  | 0 | 1 | 0 | 0 | 0 | 0 | 0 | 0 | 0 | 0  | 0  |
| 3  | 1 | 0 | 1 | 0 | 1 | 0 | 0 | 0 | 0 | 0  | 0  |
| 4  | 0 | 1 | 1 | 1 | 0 | 0 | 0 | 0 | 0 | 0  | 0  |
| 5  | 0 | 0 | 0 | 1 | 1 | 0 | 0 | 0 | 0 | 0  | 1  |
| 6  | 0 | 1 | 0 | 0 | 0 | 1 | 0 | 0 | 0 | 0  | 0  |
| 7  | 0 | 0 | 1 | 0 | 0 | 0 | 1 | 0 | 0 | 0  | 0  |
| 8  | 1 | 0 | 0 | 0 | 0 | 0 | 0 | 1 | 0 | 0  | 0  |
| 9  | 0 | 0 | 0 | 0 | 0 | 0 | 1 | 1 | 1 | 0  | 1  |
| 10 | 0 | 0 | 0 | 0 | 0 | 0 | 0 | 0 | 0 | 1  | 0  |
| 11 | 0 | 0 | 0 | 0 | 1 | 0 | 0 | 0 | 0 | 0  | 1  |

FIG. 2F

PROBLEMS

| SYMPTOMS | 1 | 2 | 11 |
|---|---|---|---|
| 3 | 1 | 1 | 1 |
| 6 | 0 | 1 | 0 |
| 7 | 1 | 1 | 1 |
| 9 | 1 | 1 | 1 |
| 10 | 1 | 1 | 1 |

FIG. 2G

PROBLEMS

| SYMPTOMS | 1/11 | 2 |
|---|---|---|
| 3 | 1 | 1 |
| 6 | 0 | 1 |

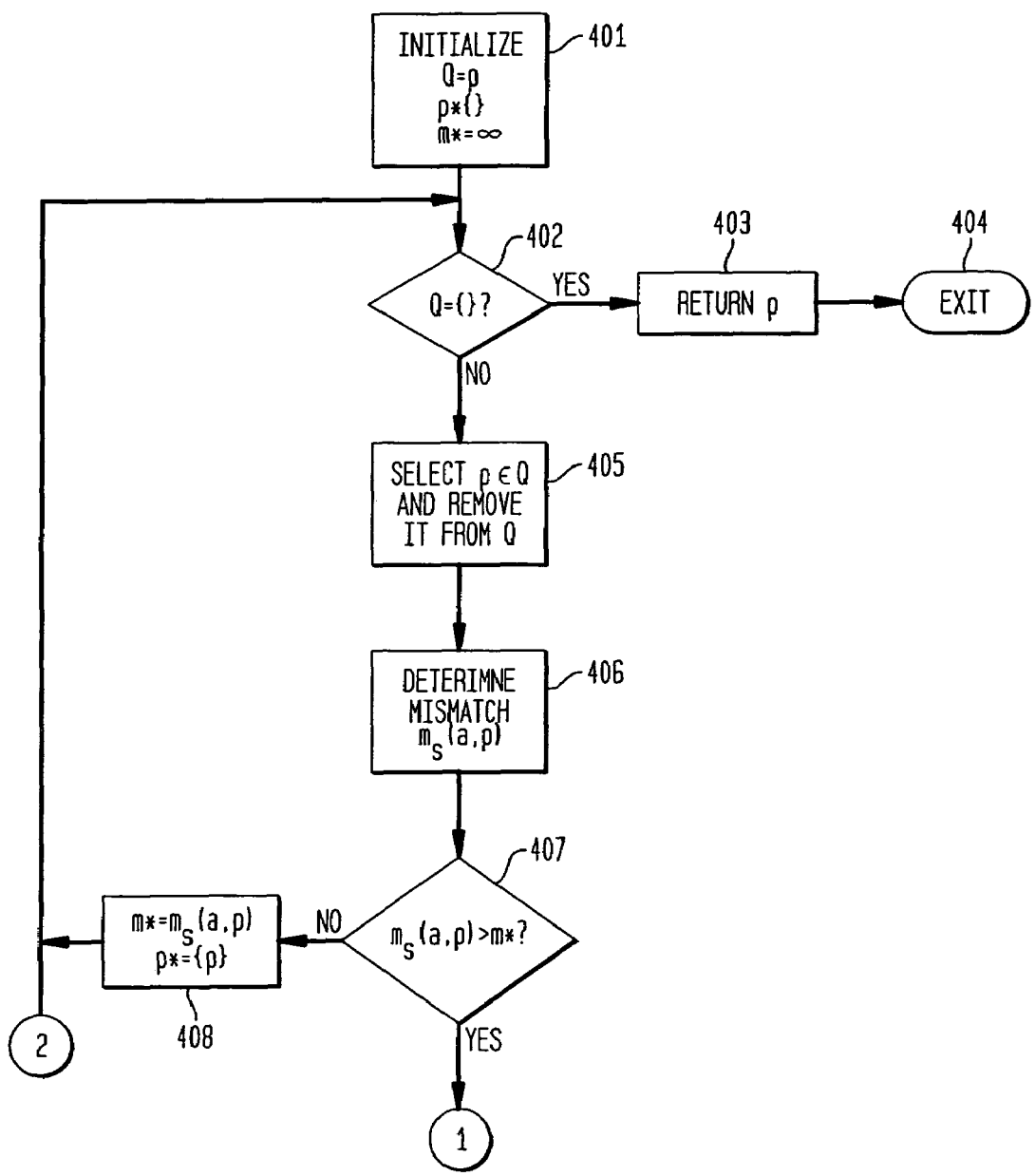

|    | $P_1$ | $P_2$ | $P_3$ | $P_4$ | $P_5$ | $P_6$ |
|----|-------|-------|-------|-------|-------|-------|
| 1  | 1 | 0 | 1 | 1 | 0 | 1 |
| 2  | 1 | 1 | 1 | 1 | 0 | 0 |
| 3  | 1 | 1 | 1 | 0 | 1 | 0 |
| 4  | 1 | 0 | 0 | 0 | 1 | 1 |
| 5  | 1 | 0 | 1 | 1 | 0 | 1 |
| 6  | 1 | 0 | 1 | 1 | 0 | 1 |
| 7  | 1 | 1 | 1 | 0 | 0 | 1 |
| 8  | 1 | 0 | 0 | 1 | 1 | 1 |
| 9  | 0 | 0 | 0 | 1 | 1 | 1 |
| 10 | 0 | 1 | 1 | 1 | 1 | 0 |
| 11 | 0 | 0 | 0 | 1 | 1 | 0 |
| 12 | 0 | 1 | 0 | 1 | 0 | 0 |
| 13 | 0 | 1 | 0 | 1 | 1 | 0 |
| 14 | 0 | 0 | 0 | 0 | 0 | 1 |
| 15 | 0 | 0 | 1 | 0 | 1 | 1 |
| 16 | 0 | 1 | 1 | 0 | 0 | 1 |
| 17 | 0 | 1 | 0 | 0 | 1 | 1 |
| 18 | 0 | 1 | 1 | 1 | 0 | 0 |
| 19 | 0 | 1 | 1 | 0 | 1 | 0 |
| 20 | 0 | 0 | 0 | 0 | 1 | 1 |

|   | $P_1$ | $P_2$ | $P_3$ | $P_4$ | $P_5$ | $P_6$ |
|---|---|---|---|---|---|---|
| 1 | 1 | 0 | 1 | 1 | 0 | 1 |
| 3 | 1 | 1 | 1 | 0 | 1 | 0 |
| 4 | 1 | 0 | 0 | 0 | 1 | 1 |

FIG. 5D

|   | $P_1$ | $P_2$ | $P_3$ | $P_4$ | $P_5$ | $P_6$ |
|---|---|---|---|---|---|---|
| 1 | 1 | 0 | 1 | 1 | 0 | 1 |
| 2 | 1 | 1 | 1 | 1 | 0 | 0 |
| 3 | 1 | 1 | 1 | 0 | 1 | 0 |
| 10 | 0 | 1 | 1 | 1 | 1 | 0 |
| 15 | 0 | 0 | 1 | 0 | 1 | 1 |

FIG. 5E

| $\delta$ | 1 | 1 |
|---|---|---|
| 0 | 0 | $\alpha$ |
| 1 | $\beta$ | 0 |

APPARATUS AND METHOD FOR EVENT CORRELATION AND PROBLEM REPORTING

CLAIM OF PRIORITY

This application is a continuation of and claims the benefit of the earlier filing date of U.S. patent application Ser. No. 11/034,192, entitled "Apparatus and Method for Event Correlation and Problem Reporting," filed on Jan. 12, 2005, now U.S. Pat. No. 7,003,433, which is a continuation of U.S. patent application Ser. No. 10/400,718, entitled "Apparatus and Method for Event Correlation and Problem Reporting," filed on Mar. 27, 2003, now U.S. Pat. No. 6,868,367, which is a continuation of U.S. patent application Ser. No. 09/809,769 filed on Mar. 16, 2001, now abandoned, which is a continuation of U.S. patent application Ser. No. 08/893,263, now U.S. Pat. No. 6,249,755, filed on Jul. 15, 1997, which is a continuation of U.S. patent application Ser. No. 08/679,443, now U.S. Pat. No. 5,661,668, filed on Jul. 12, 1996, which is a continuation of U.S. patent application Ser. No. 08/465,754, filed on Jun. 6, 1995, now abandoned, which is a continuation of U.S. patent application Ser. No. 08/249,282, now U.S. Pat. No. 5,528,516, filed on May 25, 1994.

BACKGROUND OF THE INVENTION

1. Technical Field

This invention relates to the field of event correlation and, more particularly, to a method and apparatus for efficiently determining the occurrence of and the source of problems in a complex system based on observable events. The invention has broad application to any type of complex system including computer networks, satellites, communication systems, weapons systems, complex vehicles such as spacecraft, medical diagnosis, and financial market analysis.

2. Related Information

As computer networks and other systems have become more complex, their reliability has become dependent upon the successful detection and management of problems in the system. Problems can include faults, performance degradation, intrusion attempts and other exceptional operational conditions requiring handling. Problems generate observable events, and these events can be monitored, detected, reported, analyzed and acted upon by humans or by programs. However, as systems have become more complex, the rate at which observable events occur has increased super-linearly, making problem management more difficult.

As an example, when the number of computer nodes in a network increases, the network complexity increases super-linearly with the number of nodes, with a concomitant increase in the fault rate. Compounding this problem of network complexity is fault propagation between both machines and network protocol layers; these propagated faults can generate additional events.

Automated management systems can help to cope with this increase in the number and complexity of events by (1) automating the collection and reporting of events, thereby reducing the load on human operators or programs; (2) using event correlation techniques to group distinct events, thereby compressing the event stream into a form more easily managed by human operators; (3) mapping groups of events to their underlying causes, thus reducing the time between faults and repairs; and (4) automatically correcting diagnosed problems, thereby minimizing operator intervention.

Event correlation and management techniques are a particularly important method of reducing the number of symptoms in a system which need to be analyzed and accurately determining the number and identity of discrete problems which need to be rectified. Unless events are correlated, a single problem in a single subsystem could result in multiple, uncoordinated corrective actions. This can lead to wasteful resources spent on duplicate efforts and inconsistent corrective actions which result in an escalation of problems.

Conventional and previously proposed approaches to managing faults in a system have failed to fully address the increase in complexity and have failed to provide adequate performance for large systems, as outlined more particularly herein. In order to discuss these problems, it is first necessary to understand these other approaches.

Event correlation and management approaches can be generally grouped into five categories: (1) rule-based reasoning; (2) case-based reasoning; (3) reasoning with generic models; (4) probability networks; and (5) model-based reasoning. In addition, a number of different architectures have been considered to carry out event correlation and management. In order to review these approaches, the following terminology is defined:

KNOWLEDGE REPRESENTATION: The format and means for representing knowledge about the system being monitored, such as the types of network components and the network topology. Such knowledge may be stored in a hierarchical relational or object-oriented database.

KNOWLEDGE ACQUISITION: The methods and means for acquiring the knowledge about the system to be monitored. Ideally, knowledge is automatically obtained during system operation to minimize human resource requirements. However, in actuality much knowledge acquisition involves humans familiar with the operation and idiosyncrasies of a system.

EVENT CORRELATION: The methods and means for detecting the occurrence of exceptional events in a complex system and identifying which particular event occurred and where it occurred. The set of events which occur and can be detected in the system over a period of time will be referred to as an "event stream." It will be noted that the location of the event is not necessarily the location where it is observed, because events can propagate across related entities in a system. Although every possible reportable measurement (such as voltage level, disk error, or temperature level) could be considered to be an "event", many of these measurements do not contribute to identifying exceptional events in the system. Event correlation takes as input an event stream, detects occurrence of exceptional events, identifies the particular events that have occurred, and reports them as an output.

Event correlation can take place in both the space and time dimensions. For example, two events whose sources are determined to be in the same protocol layer in the same network element may be related spatially. However, they may not be correlated if they occur on different days, because they would not be related temporally.

1. Rule-Based Reasoning Methods

One approach for correlating events in complex systems involves rule-based reasoning, such as expert systems. Rule-based expert systems generally contain two components:

(1) a working memory which represents knowledge of the current state of the system being monitored; and (2) a rule base which contains expert knowledge in the form of "if-then" or "condition-action" rules. The condition part of each rule determines whether the rule can be applied based on the current state of the working memory; the action part of a rule contains a conclusion which can be drawn from the rule when the condition is satisfied.

Rule-based reasoning can proceed in one of two possible modes of operation. In FORWARD CHAINING mode, the working memory is constantly scanned for facts which can be used to satisfy the condition part of each rule. When a condition is found, the rule is executed. Executing a rule means that the working memory is updated based on the conclusion contained in the rule. These newly updated data can be used to satisfy the conditions of other rules, resulting in a "chain reaction" of rule executions.

In BACKWARD CHAINING mode, the system is presented with a "goal" working memory datum, which it is asked to either confirm or deny. The system searches for rules whose action part could assert the goal; for each such rule, the condition corresponding to the action is checked against the working memory to see if it is satisfied. The conditions can be satisfied by either finding the appropriate working memory data or by finding other rules whose conditions are satisfied which could assert the desired working memory data.

Rule-based expert systems benefit from straightforward knowledge acquisition because the "if-then" format of the rules often mimics the format of expert knowledge. The knowledge base can be incrementally modified because rules can be added or modified easily. However, attempts to automate knowledge acquisition for such systems have produced limited results.

Rule-based expert systems can be used to perform event detection and event correlation by providing a link between the working memory and the event stream. However, there are several inherent disadvantages. For example, for a very large knowledge base, the performance of the system can suffer exponentially with the number of condition parts of the rules. The search associated with rule-based systems can be of exponential complexity in the number of rules (size of knowledge base). It is difficult to ensure that firing sequences of a complex rule-based system actually terminate. The complexity of the search is also exponential in the size of the working memory. The working memory includes the events to be correlated. If the system involves a large number of events, the working memory (and therefore the search) may be unbounded. A rule based system can be very sensitive to lost or spurious event data. Such perturbations in the input can have unpredictable or controllable results. Furthermore, a rule-based system can be sensitive even to the order in which input patterns are provided. Different orders may lead to different results and time to converge. There are no techniques to ensure that a rule based system contains sufficient rules to resolve correlations. Moreover, like any computer program, an arbitrary set of rules may execute an indefinite or even infinite number of rules before completion; a rule-based algorithm can involve an arbitrarily long or even infinite cycle of rule firings. A minor defect in the knowledge base could render the system useless. The knowledge base is "brittle" in that if the problem domain changes in any way, the system will no longer perform.

2. Case-Based Reasoning Methods

Case-based reasoning methods and systems involve storing knowledge as a repository of successful cases of solved problems called a case base. When the system is presented with a problem, it searches the case base for similar cases. Once the similar cases are retrieved, various problem-solving strategies must be adapted to the case at hand. If the adapted strategy successfully solves the problem, then the newly solved problem can be added to the case base with the adapted solution.

One way to more closely match problems with those in the case base is to use "determinators." Determinators are a way of narrowing the similarity criteria to attributes of a problem which are relevant to solving the problem. For example, the solution to the problem "file transfer throughput is slow" could be determined by looking at bandwidth, network load, packet collision rate and packet deferment rate; these would constitute determinators. Parameterized adaptation such as interpolating among solutions to similar problems located in the case base can be used to provide solutions to new problems.

However, case-based approaches have inherent disadvantages. For example, the case base grows as problems are solved over a long period of time, and there may be more cases in the case base than is strictly necessary to solve the range of problems encountered. Effort must be expended not only on acquiring knowledge for storage in the case base, but also on identifying and creating appropriate determinators to operate the system effectively. It may be necessary for experts to directly enter cases into the system to fully capture their value, and it may be difficult to determine when the case base is sufficiently large to solve a prescribed range of problems. In some cases, the experts may even need to participate directly in knowledge acquisition while the system is operating. The system may not be usable until a large number of problems have been encountered and solved. It is difficult to maintain a case-based system through changes in a networked system. Changes will invalidate certain cases, leading to inconsistencies. Like rule based systems, case-based systems can involve significant and slow search, can be difficult to validate and may be sensitive to loss or spurious generation of symptoms (these may be seen as different cases).

3. Reasoning with Generic Models

Generic models rely on generic algorithms, rather than expert knowledge, to correlate events based on an abstraction of the system architecture and its components. As an example, each event can be normalized to include a list of all possible faults which could have been responsible for the event. (This is an abstraction of a real event which could carry much more varied information). Then all the various events are collected and the intersection of their sources is determined and output as the diagnosis.

As an example, if events A and B are detected, and it is known that event A could have been caused by problems 1, 2, or 3, and event B could have been caused by problems 2, 4, or 6, then the diagnosis is that problem 2 has occurred because it represents the intersection of the possible sources of events A and B. The complexity of this approach is generally the number of events multiplied by the number of source faults which could have generated the events. For very large and complex systems, the storage and search requirements can be unacceptable.

4. Probability Networks

The various approaches outlined above can be augmented with probability information. For example, a rule of the form "if A then B" can be augmented with a certainty factor: "if A then B with certainty 90%."

The element of a probability network is a proposition, which is a hypothesis about the state of the system being monitored. For example, the hypothesis "node A is faulty" is a proposition. A probability is associated with each proposition, which is its a priori probability of truth. Additionally, probabilities can be assigned to the relationships between propositions. For example, "the truth of proposition A causes the truth of proposition B with probability 90%." When an event occurs, the probability of the proposition representing the occurrence of that event is updated to 100%, and this change is propagated to other propositions in the network based on the relationships. A diagnosis can be generated by simply listing those propositions having the highest probabilities.

Probability networks may be advantageous in that they can produce hypotheses with a precise confidence level. However, in the worst case, every proposition has a causal relationship with every other proposition, in which case the number of connections in the probability network would be approximately equal to the square of the number of propositions in the network. Moreover, the complexity of an event correlation algorithm using probability networks is typically high.

Another approach which can be included in this category is often referred to as Fuzzy Backward Reasoning (FBR), based on principles of fuzzy logic. Fuzzy logic describes uncertain knowledge in terms of subintervals of [0, 1]. For example, the likelihood of a problem can be represented as an interval [0, 0.4]. The certainty (fuzziness) of the problem is given by 0.4. Fuzzy logic, in a manner similar to Boolean logic, defines operations in terms of intervals. The product of two intervals is their intersection, while the sum is their union.

FBR can be used to model causality among problems and symptoms using a matrix R of fuzziness indicators. For a vector a of problems and a vector b of symptoms, the problem of fuzzy backward reasoning can be defined as computing the problem vector a that solves the equation b=a*R. However, this approach has severe disadvantages. For example, there may be no solutions to the equation, or there may be many solutions to the equation. Moreover, a small error in the model (e.g., in the fuzziness indicators of R) can lead to significant errors in the result. A small error can also transform an equation with multiple solutions into one with no solutions and vice versa, or yield completely different solutions. Lost or spurious symptoms may result in no solution to the equation rather than detecting the possible loss. Moreover, the FBR approach does not permit simple reduction of symptoms to be observed (e.g., reducing a fuzziness matrix R to a much smaller matrix R'). Finally, the complexity of FBR can be exponential in the number of problems, because it seeks to compute all possible combinations of problems that could yield a particular observation. In short, the FBR approach does not solve the problems outlined above with respect to complexity and performance.

5. Model-Based Reasoning

Model-based reasoning involves creating a model which represents the underlying system being monitored. One example of a model is a finite state machine (FSM) for modelling possible states of the system. As messages are observed at any location in the system, the model is used to update the estimate of the current state of the system.

However, it may be difficult or impossible to accurately model the underlying system, particularly if it is complex. Moreover, for complex phenomena, an FSM representation can quickly grow to unmanageable size because of the simplicity of the model. The time complexity of an event correlation algorithm using an FSM is typically linear in the number of events at each machine.

Event Correlation and Management Architectures

A number of different architectures have been proposed for carrying out event correlation and management along the principles discussed above. These can be generally grouped into: (A) blackboard architectures; (B) event detection architectures; (C) network modelling architectures; and (D) simulation architectures. A brief discussion of each, including their disadvantages, follows.

A. Blackboard Architectures

A blackboard architecture generally comprises one or more knowledge sources (KS's), a blackboard, and a control shell. Each KS is a knowledge base which has a specific domain of expertise. The blackboard is a data structure which acts as a shared memory for the KS's; each KS can read from and write to the blackboard. The control shell coordinates the activities of the various KS's based on "triggering" blackboard events. Once a KS is scheduled by the control shell, it scans the blackboard for knowledge that it needs to perform its inference. The output of a scheduled KS may be further blackboard events (i.e., changes to the data on the blackboard).

For example, a basic system could have two knowledge sources: a protocol diagnoser and a hardware diagnoser. The protocol diagnoser KS could be implemented with model-based reasoning using an FSM model of the protocol, while the hardware diagnoser could use a rule-based system as outlined above. The protocol diagnoser KS could write a diagnosis to the blackboard indicating that a given router is not obeying the protocol specifications. The hardware diagnoser KS could then read this diagnosis from the blackboard and initiate a hardware diagnosis for the given router. To achieve this sequence, the control shell would be instructed to activate the hardware diagnoser KS whenever the protocol diagnoser indicates a hardware fault.

While blackboard architectures are modular (i.e., they allow the integration of many types of reasoning methods for a single system) and allow various KS's to be developed independently (i.e., knowledge can be acquired independently from experts of each domain and then assembled into a complete system), they also have disadvantages. For example, because the blackboard must act as a global memory for all KS's, all communication must be converted into a common format understandable by all other KS's. Thus, the integration task can be enormous. Furthermore, it may be impossible to decide which KS should be scheduled without special knowledge about what is contained in the KS's themselves.

B. Event Detection Architectures

A rule-based system can be implemented for event detection whereby generated events are converted into working memory elements and inserted into the working memory of the rule-based system. The rule base would contain rules matching these memory elements, and would report a subset or summary of the events to an event correlator by inserting other working memory elements into the correlator's working memory.

For example, suppose it is desired that an OVERLOAD event be generated when a delay on 20% of the communications links in a network exceeds 5 seconds. One approach would be to continuously insert all current delays on all communications links into the working memory of the event detector, and the event detector could define the OVERLOAD event. However, this would cause a large load on the system whether or not the OVERLOAD event was of interest.

One proposal is to view all of the management information available in the network as a "network database." This network database can then be queried using a standard database query language such as SQL. Thus, the OVERLOAD event can be defined as a data pattern event which is generated whenever one of the event retrieval queries returns a value.

One advantage of this approach is that new events can be defined in a declarative manner using a database query language. However, it may be difficult to implement because there must be a mapping from the query language to actual queries to the objects in the network. Moreover, when a new query is produced, it may be difficult to determine the cost of producing the event to which the query maps; not all queries which can be generated are capable of an efficient implementation. Therefore, the complexity of this approach could be difficult to predict.

C. Network Modeling Architectures

The system under observation (such as a computer network) can be modelled as an object-oriented hierarchy, where network elements are modelled as object having associated functions for querying the values of the object's attributes. Calls to these functions would invoke a query to the database or return a value which was stored from a previous query. For example, GET_CPU_UTILZATION would return the current CPU utilization rate for a particular CPU. Logical objects representing abstractions of other objects can be defined to further expand the model. Diagnostic knowledge may be derived and represented in an object-oriented fashion, thus providing a manageable database. However, as with other object-oriented approaches, the performance of the system can be poor. Moreover, this model only provides one component of an event correlation system (i.e., the knowledge base); it does not address how to correlate events and provide a problem diagnosis.

D. Simulation Architectures

Simulation can be used to help predict underlying problems in a system. If the simulator can be made to operate in real-time, then the performance of the system can be tested under realistic conditions. The simulation can be monitored more easily than a real system, so that hidden trends may be uncovered and added to an event correlation system. Simulation techniques, however, do not generally address the problem of correlating events and producing a diagnosis of underlying problems.

SUMMARY OF RELATED FIELDS

The foregoing discussion has highlighted related approaches for event correlation and detection in systems such as computer networks. Although each of these approaches has certain advantages, these approaches generally fail to address four key problems: (1) general extensibility of the approaches to very large and complex systems having many components with interrelated events; (2) performance difficulties encountered when implementing any of the approaches to perform event correlation in real-time or near real-time; (3) extremely large data storage requirements when implemented for very large and complex systems; and (4) difficulty in capturing knowledge about relationships among events in the system being monitored. Additionally, these related approaches have failed to recognize that significant data reduction can be accomplished prior to decoding of symptoms to thereby increase overall performance and reduce complexity. Finally, the related approaches fail to overcome difficulties encountered in translating relationships among objects, symptoms and problems in a system into data structures which can be used for decoding symptoms in the system.

SUMMARY OF THE INVENTION

The present invention overcomes the aforementioned problems by providing a method and apparatus for efficiently determining problem events from observable symptoms. The inventors of the present invention have discovered that by treating the detection and identification of exceptional events in a system as a coding problem, it can be performed extremely efficiently. More specifically, event correlation (correlating observed events to specific problems) can be split into two separate activities: (1) generating efficient codes (sets of symptom events) for problem identification, and (2) decoding the event stream. Detection and identification of problems in the system can be done efficiently because (1) redundant and inefficient data is eliminated during code generation, leaving a greatly reduced amount of data to be analyzed during the decoding phase, and (2) comparing codes against observed symptoms is of minimal computational complexity.

Various embodiments of the method of the invention generally contemplate a four-step process, simplified here for the purposes of introduction:

(1) Specifying an event model and a propagation model for classes of components in the system. This specification can be provided as early as component design time or later. The specification may include the exceptional events associated with each class of component, their corresponding local symptoms, and the potential relationships with other components along which events can propagate. An exceptional event may be an event that requires some handling action (e.g., a problem such as a defective disk drive, or adding a workstation to a LAN) while a symptom may be an observable event (e.g., excessive read/write errors for the disk, or a change in routing tables) caused by the exceptional event. Events may propagate between objects along relationships associated with their classes. For example, components of a type "LINK" may have an exceptional event "LINK FAILURE". Links may have a relationship "connected-to" with components of type NODE. Link failure can propagate from a LINK to a NODE along this "connected-to" relationship, being observed in NODE via the symptom "NODE-UNREACHABLE".

(2) Creating a causality data representation of problems and symptoms for the system to be monitored (the term "problem" as used in this specification will be understood to mean any exceptional event). The causality data representation includes data to describe problems, events and their causal relations both within a component and across components. This representation may associate with causal relations probabilities, or other measures of likelihood, that certain events cause each other. It may also associate other performance measures that may be useful in correlating events, such as the expected time for the causal relations among events to happen. In a preferred embodiment the causality data representation utilizes a matrix. This causality matrix contains a mapping of symptoms to likely problems in the systems, with probabilities for each cell of the matrix. The matrix is manipulated to ensure that columns are sufficiently distinguishable from one another (i.e., no two problems are close to one another under a defined distance measure). A distance measure, which can be defined arbitrarily, adds robustness by allowing the invention to tolerate a loss of events or spurious symptoms. (In a rule-based system, a large number of combinations of subsets of the rules would need to be tried to get the same effect).

The causality data representation may be created by a human, or it may be automatically generated based on an event/propagation model such as that specified in step (1) and a configuration specification (which may be stored in a database), or by other means. For complex systems, a causality matrix may be very large and unwieldy. In such systems, other causality data representations may be more advantageous.

(3) Finding an optimal codebook by reducing the amount of information in the causality structure to the minimum required to identify problems. This may be done by finding a minimal subset of the symptoms that provide an acceptable level of problem identification. The optimal codebook can also be used to identify those symptoms which would provide the greatest information benefit if monitored. The resulting codebook provides an efficient arrangement of information for real-time decoding by a computer. The manipulations to the codebook are typically done prior to decoding.

(4) Continuously monitoring and decoding the symptoms by locating the "best fit" problem in the optimal codebook which matches a particular set of symptoms. Various best-fit approaches can be used, such as determining a Hamming distance among vectors. Error correcting bits can also be introduced into the codebook to handle noisy symptoms.

An output such as a report is generated indicating the most likely problem or problems based on the observable events. The decoding step can occur very efficiently because (1) the codebook has a greatly reduced amount of information and (2) determination of the "best fit" codes for the observed symptoms can be carried out very quickly.

An additional feature of the invention is the ability to handle "second-order" symptoms (artificial symptoms created by analyzing changes and patterns in existing symptoms). As an example, the rate at which a particular group of symptoms changes can be monitored itself as a "symptom".

The invention provides a method and apparatus for using a formal machine-compilable language to capture event information and event propagation information in a system based on classes of components in the system. This captured information may then be used to determine which symptoms can be most effectively monitored in order to achieve a selected degree of certainty with respect to problem identification and isolation. The captured information may also be selectively reduced to increase the efficiency of automated problem identification.

The invention further provides a method and apparatus for generating a causality matrix for a dynamically changing system from static event information and event propagation information for component classes, and the dynamic specification of a particular system configuration. The causality matrix may be used to decode problems in the system based on observable symptoms with increased efficiency.

The invention further provides a method and apparatus for detecting problems in a dynamically changing system through the use of efficient "codes" (sets of symptom events); the "codes" may be determined and optimized outside the critical real-time path, making it possible to optimize performance in the real-time path.

The invention further provides a method and apparatus for decoding observed symptoms in a dynamically changing system to efficiently detect and identify problems in real-time by comparing vectors of observed symptoms to "codes" for the problems. A mismatch measure can be used to vary the degree of certainty required in reporting particular problems. Additional advantages of the present invention will become apparent through the following detailed explanation and the drawings incorporated herein,

BRIEF DESCRIPTION OF THE DRAWINGS

FIG. 2F shows a correlation matrix corresponding to the simplified graph of FIG. 2E.

FIG. 2G shows a matrix in which redundant symptoms have been eliminated.

FIGS. 4A and 4B show a process for decoding problems using a codebook in accordance with various embodiments of the invention.

FIG. 5A shows a well-formed correlation matrix for 6 problems producing 20 symptoms.

FIG. 5B shows progressive generation of an optimal codebook with a distance measure of d=1.

FIG. 5C shows a simplified matrix (optimal codebook) having a distance measure of d=1.

FIG. 5D shows a simplified matrix (optimal codebook) having a distance measure of d=2.

FIG. 5E shows a sample mismatch measure for use in a decoding process.

DETAILED DESCRIPTION OF THE PREFERRED EMBODIMENTS

Figure 1A:
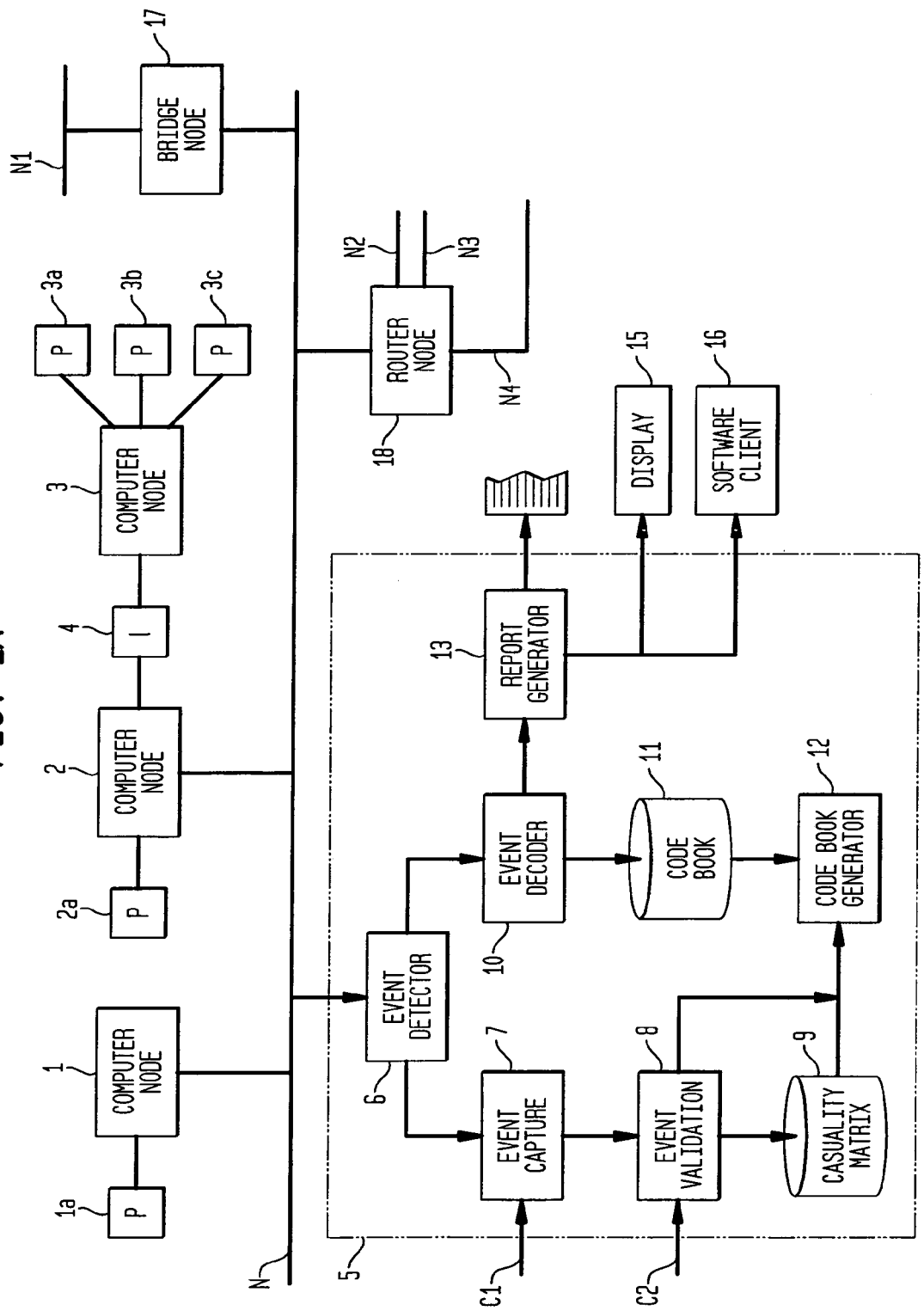
FIG. 1A shows a system of computer nodes employing apparatus 5 in accordance with various embodiments of the present invention.

FIG. 1A shows a networked computer system connected to apparatus 5 in accordance with the principles of the present invention. Three computer nodes 1, 2, and 3 are shown connected to a computer network N. The network N is interconnected with other networks (N1, N2, N3, N4) via communication nodes, a bridge node 17 and a router node 18. The phrase "network of computer nodes" as used herein and in the claims will be understood to refer to both a network which only includes computer nodes and to a network which further includes communication nodes. Each computer node may also be connected to peripherals such as 1a, 2a, and 3a–3c. Moreover, two or more computer nodes may be connected via an interface 4. Each computer node may generate one or more signals on network N, or through other means, corresponding to symptoms in the system. Examples of symptoms for which signals may be generated could include power failure, peripheral failure, temperature limit exceeded, network interface error, adding a new address on the network, or the like. Of course, any conceivable type of symptom which can be detected could be generated. Through the use of apparatus 5, the networked computer system may be monitored and problems reported based on observed symptoms.

Apparatus 5, which may be implemented on a computer of any of various types, is connected to network N, although it may be connected to the system through any other means such as direct I/O connections to the various computer nodes or by a wireless link. Apparatus 5 includes event detector 6 which receives and monitors events representing symptoms and determines that a particular event has occurred (for example, a power failure message received from one of the computer nodes). These events, generated by computer nodes 1–3, may be transmitted by any suitable means, such as sending data packets over an Ethernet which are received by apparatus 5.

Apparatus 5 also includes event decoder 10 which receives detected events from event detector 6 and, by way of codebook 11, determines one or more "best fit" problems corresponding to the detected event. Codebook 11 may be stored in a computer storage device such as a disk file or in computer memory, and event decoder 10 comprises means for reading values from codebook 11. After determining the best fit problem, event decoder 10 causes report generator 13 to generate a report 14 which provides an indication of a problem for which corrective action might be taken. Report 14 may be generated in any of various forms such as a message sent to computer systems responsible for automated handling of problems, a record of the problem logged in a storage device (such as a file or a database), a computer-generated printout, a computer display 15, data sent to a software client 16, indicators on a control panel, or the like. Additionally, the reported information may be displayed in alphanumeric or graphical form, or it may comprise a signal containing the reported information which may be further transmitted to another location. Codebook 11 may be generated by codebook generator 12 in accordance with the principles of the invention as outlined in more detail herein. The term "file" as used herein will be understood to include any computer accessible storage including memory, disk, or the like.

A causality matrix 9 contains a mapping of system symptoms to likely problems, preferably with probabilities corresponding to each mapping. Thus, for example, the likelihood that a reported power failure in one of the computer nodes is the result of a blown fuse might be assigned a probability of 0.25. Although causality matrix 9 may be generated by manual means, it may be generated automatically using event capture 7 and event validation 8 based on events which are observed over a period of time, or it may be generated by interpreting a formal specification of an event model and an event propagation model in a specific domain, both described in more detail herein. For example, the latter may be performed by generating a causality matrix by compiling a formal language that specifies the event and propagation model into methods and data structures that interpret the models in a specific configuration. This process is described in more detail herein. Event capture 7 and event validation 8 may be controlled interactively by way of control means C1 and C2, respectively, such as through operator input using a suitable command stream.

Figure 1B:
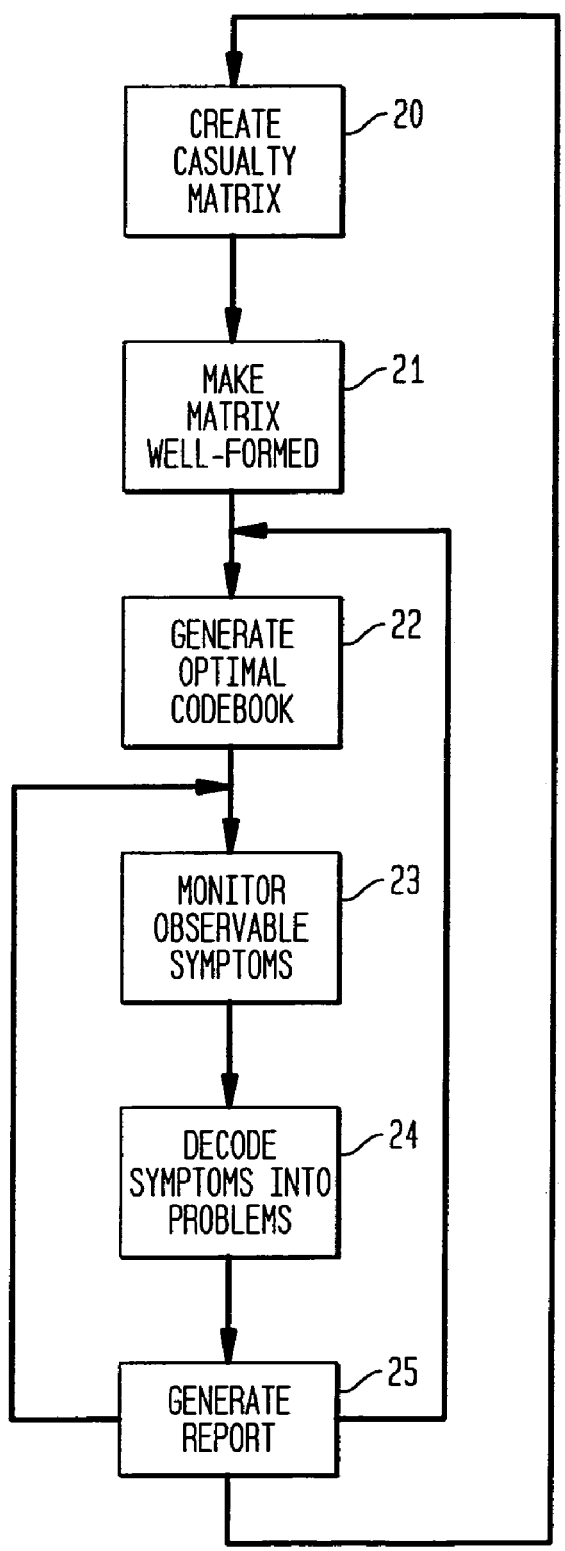
FIG. 1B shows a method for employing the principles of the present invention.

FIG. 1B illustrates a method for employing the principles of the present invention in various embodiments. Beginning with step 20, a causality matrix is created, the matrix comprising a mapping of observable symptoms in the system to likely problems corresponding thereto. At step 21, the causality matrix is made "well-formed" by eliminating redundant information in rows and columns. At step 22, an optimal codebook is generated which further reduces the amount of information in the matrix; this optimal codebook may be tailored for a particular level of error tolerance or symptom loss as described in more detail herein. At step 23, observable symptoms generated by the system are monitored, and at step 24 these monitored symptoms are decoded into problems, preferably using a mismatch measure to determine their closeness to the observable symptoms contained in the optimized codebook. At steps 25, a report is generated corresponding to the one or more likely problems decoded from the optimized codebook. The process may then either repeat at step 23, or the generated report can be fed to either step 20 or step 22 to refine the causality matrix or the codebook respectively.

Figure 1C:
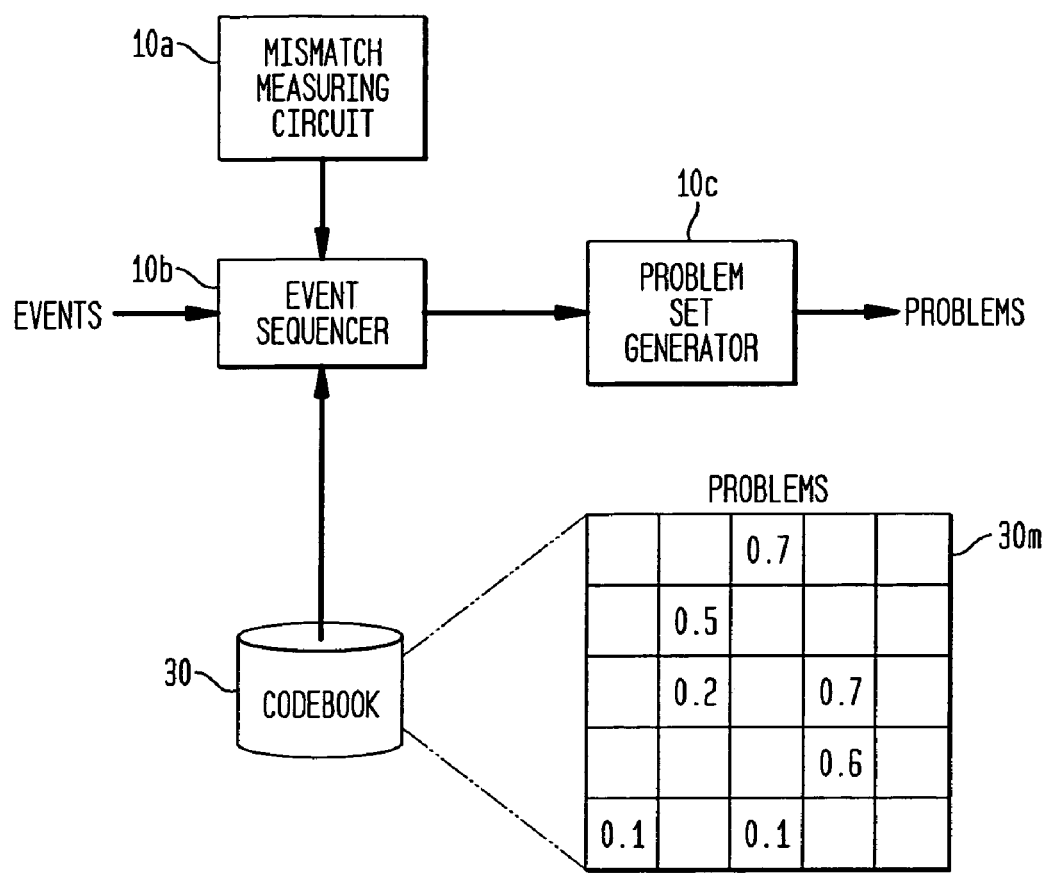
FIG. 1C shows details of one possible embodiment of event decoder 10.

FIG. 1C shows details of one possible embodiment for event decoder 10. Codebook 30, which represents the same element as codebook 11 of FIG. 1A, contains an illustrative set of numerical probability values shown as 30M. Event sequencer 10b receives events such as vectors of symptoms and, for each such vector, retrieves values from codebook 30. Mismatch measuring circuit 10a is used by event sequencer 10b to compare symptom vectors with values contained in codebook 30. The "best fit" matches between values contained in codebook 30 and incoming symptom vectors are provided to problem set generator 10c, which outputs a likely problem set.

Figure 1D:
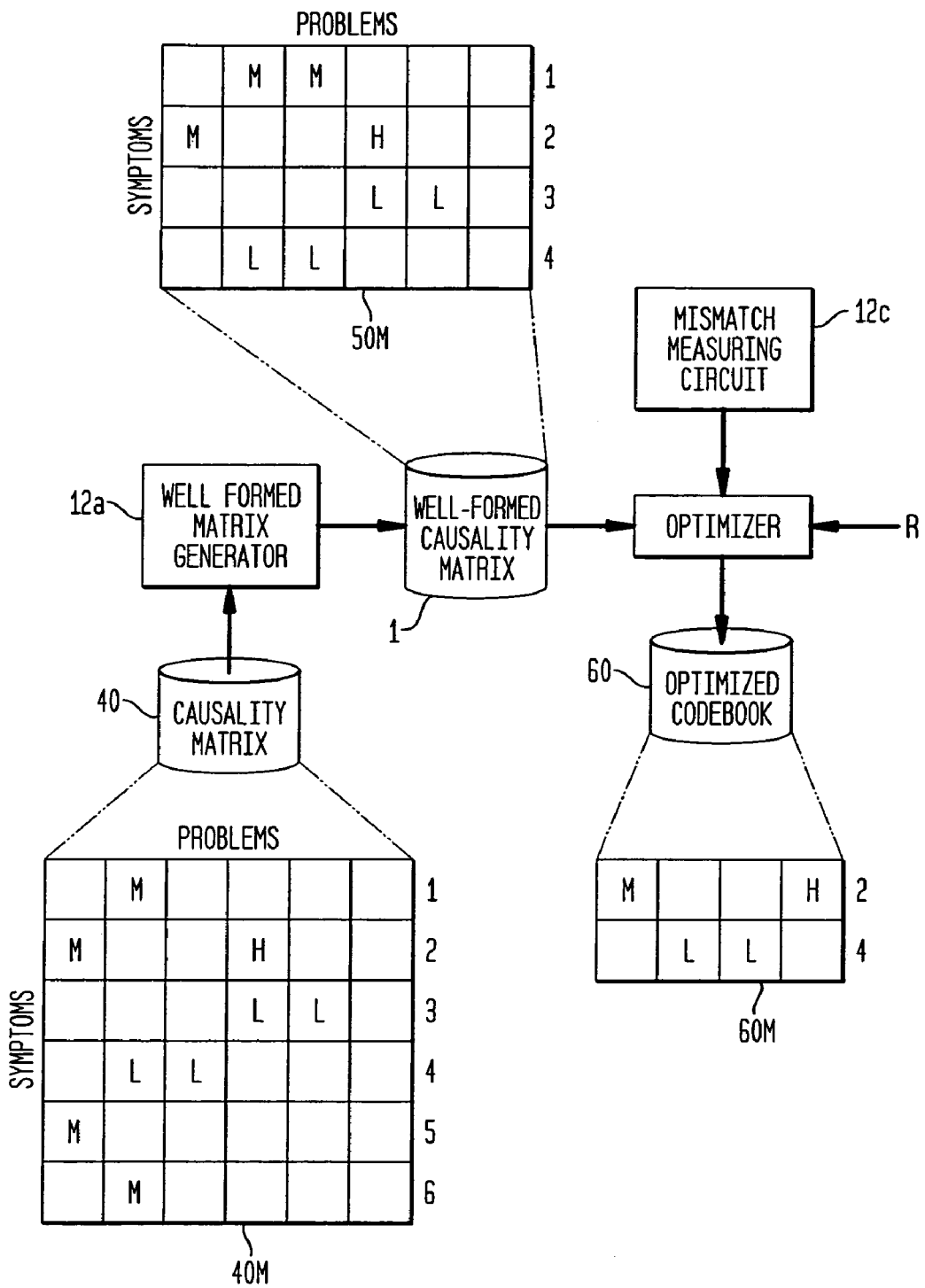
FIG. 1D shows details of one possible embodiment of codebook generator 12.

FIG. 1D shows details of one possible embodiment for codebook generator 12. Causality matrix 40, which represents the same element as causality matrix 9 in FIG. 1A, contains an illustrative set of discrete probability values shown as 40M. Optimized codebook 60, which represents the same element as codebook 11 in FIG. 1A, contains an illustrative set of discrete probability values shown as 60M. Well-formed matrix generator 12a reads values from causality matrix 40 and, through various operations described in more detail herein, removes redundant data from the matrix and generates well-formed causality matrix 50 as an intermediate product. In the illustrative example, rows 5 and 6 of causality matrix 40M have been deleted as shown in 50M.

Optimizer 12b reads values from well-formed causality matrix 50 and, through the use of mismatch measuring circuit 12c and a desired radius R, reduces the amount of information in well-formed causality matrix 50 to a smaller set which meets a given set of desirable criteria. Optimizer 12b produces optimized codebook 60 as an output, having illustrative values shown as 60M.

Figures 2A, 2B:
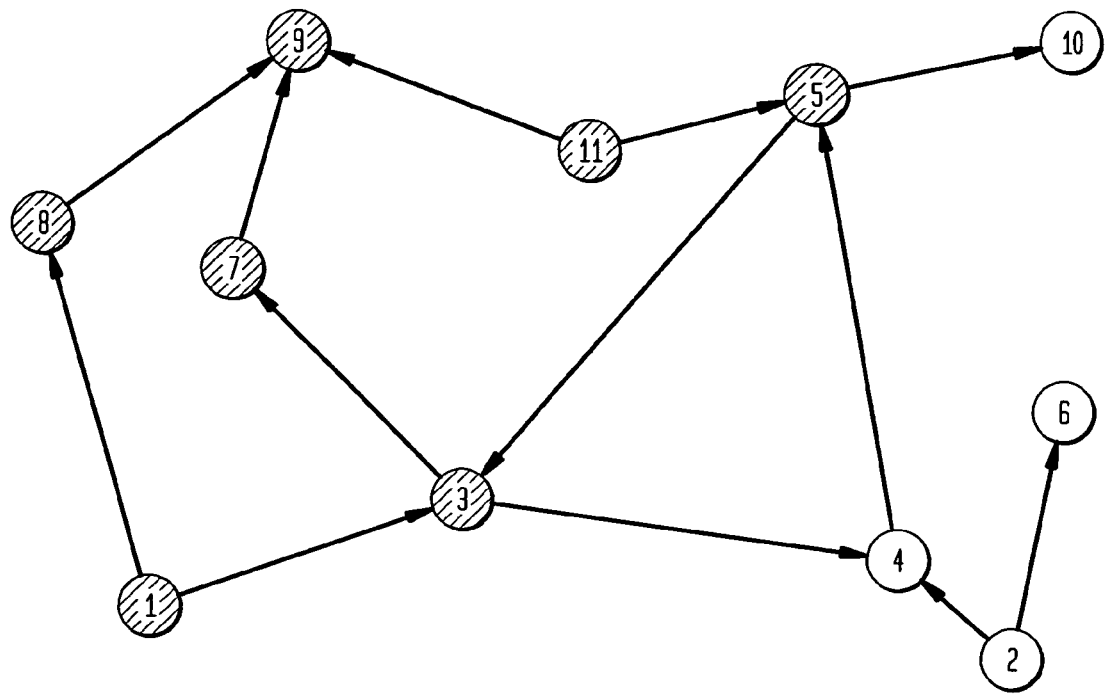
FIG. 2A shows a causality graph of events which may occur in a system.
FIG. 2B shows the same information of FIG. 2A in an incidence matrix comprising rows and columns.

FIGS. 2A to 2G show one example of how codebook 11 can be generated from causality matrix 9. FIG. 2A shows a causality graph of events which may occur in the computer system being monitored by apparatus 5. The causality graph comprises a set of numbered nodes, each representing an event in the system, and directed edges (arrows) connecting these nodes, each representing a causality relationship between the events at the tail and head of the edge. As can be seen in FIG. 2A, event 1 causes event 3, which causes event 4, which in turn causes event 5, and so on.

As an example, event 1 may be a disk drive failure in a peripheral attached to one of the computer nodes in FIG. 1A. Event 3, caused by event 1, may be an error message generated by the computer to which the failed disk drive is attached, the error message indicating the detected disk drive failure. In this context, event 1 can be classified as a problem (i.e., it can be fixed), while event 3 can be classified as a symptom caused by the problem. Of course, event 3 might have other causes, such as event 5, as indicated in FIG. 2A.

The method and means for converting the causality graph of FIG. 2A into codebook 11 will now be described in detail.

Generating a Well-Formed Correlation Matrix

FIG. 2B shows the same information in the causality graph of FIG. 2A in the form of an incidence matrix comprising a plurality of rows and columns which define a plurality of cells, each cell corresponding to an intersection of one row and one column. Each cell contains a value (in this example, either 0 or 1) indicating whether or not a particular event is caused by another event. Thus, for example, event 3 (third column) causes events 3, 4, and 7 because these rows contain a "1" for the third column. Although zeros and ones are shown in FIG. 2B, the cell values can be any value which would indicate the probability that the given event causes a corresponding event.

Figure 2C:
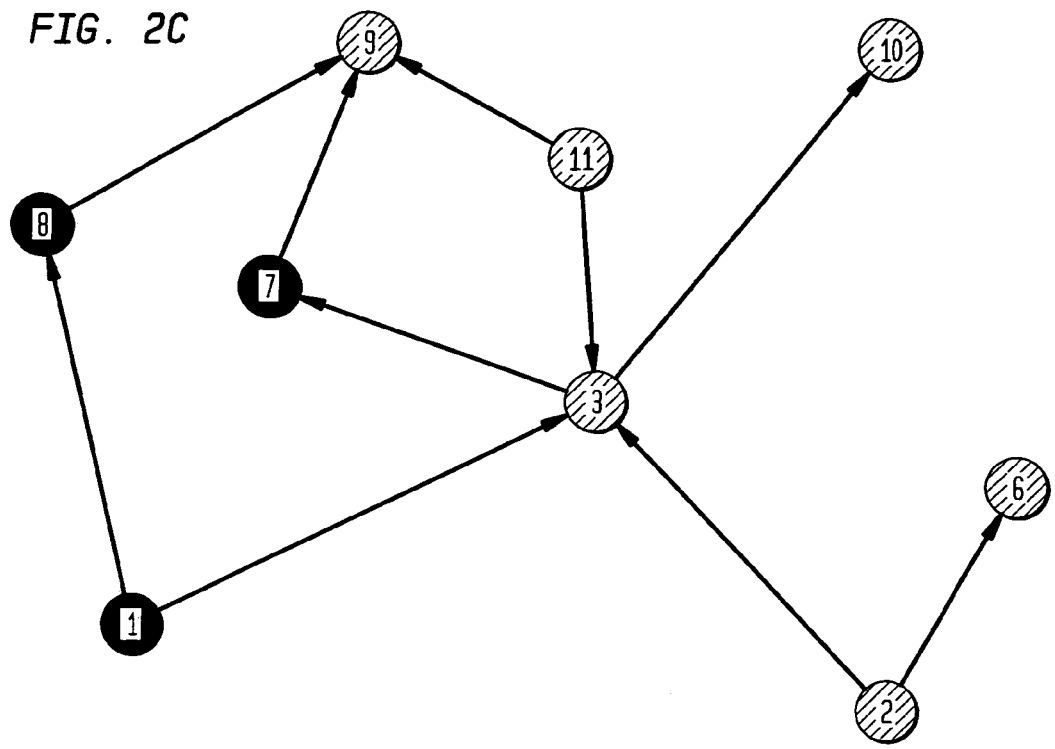
FIG. 2C shows a simplified causality graph in which certain nodes have been deleted.

The information in the incidence matrix of FIG. 2B can be simplified by noting that certain events always occur in combination. For example, in FIG. 2A, the events {3,4,5} form a correlated set (i.e., one cannot occur without the other), and they can therefore be combined into a single event 3 as illustrated in FIG. 2C whereby nodes 4 and 5 have been deleted. This first simplification of the information is thus done by replacing "cycles" in the causality graph with single aggregate nodes. The information in FIGS. 2A to 2G may be stored in a computer memory or the like in various data structures, or it may be displayed graphically on a computer screen for manipulation by a human. One of ordinary skill in the art will recognize that this information may be represented and manipulated in various ways, and further elaboration is not required.

Each node in the simplified causality graph of FIG. 2C may be designated as either a problem or a symptom. A problem is an event that requires handling, while a symptom is an event that may be observed. An event can be designated as both a problem and a symptom, or it may be neither. For example, in FIG. 2D, rectangles have been used to designate nodes which are problems, and triangles have been used to designate nodes which are symptoms. Thus, in keeping with the above example, event 1 is a disk drive failure (problem), and event 3 is an I/O error message generated by the computer connected to the failed disk drive (symptom of the problem).

Some events are of no interest and can be eliminated from the causality graph without losing any useful information. As an example, it will be noted in FIG. 2D that event 1 causes event 8, which in tuMn causes event 9. However, event 8 is only an "intermediate". event and contributes no new useful information. The graph of FIG. 2D can thus be simplified by the following steps:

(1) Select an undesignated event in the causality graph (i.e., one which has not been designated with a rectangle or triangle).

(2) For each edge leading to the event node from a first node X and for each edge exiting the node to a second node Y, create a direct edge from X to Y.

(3) Delete the undesignated event node and the lines attached to it.

Figure 2D:
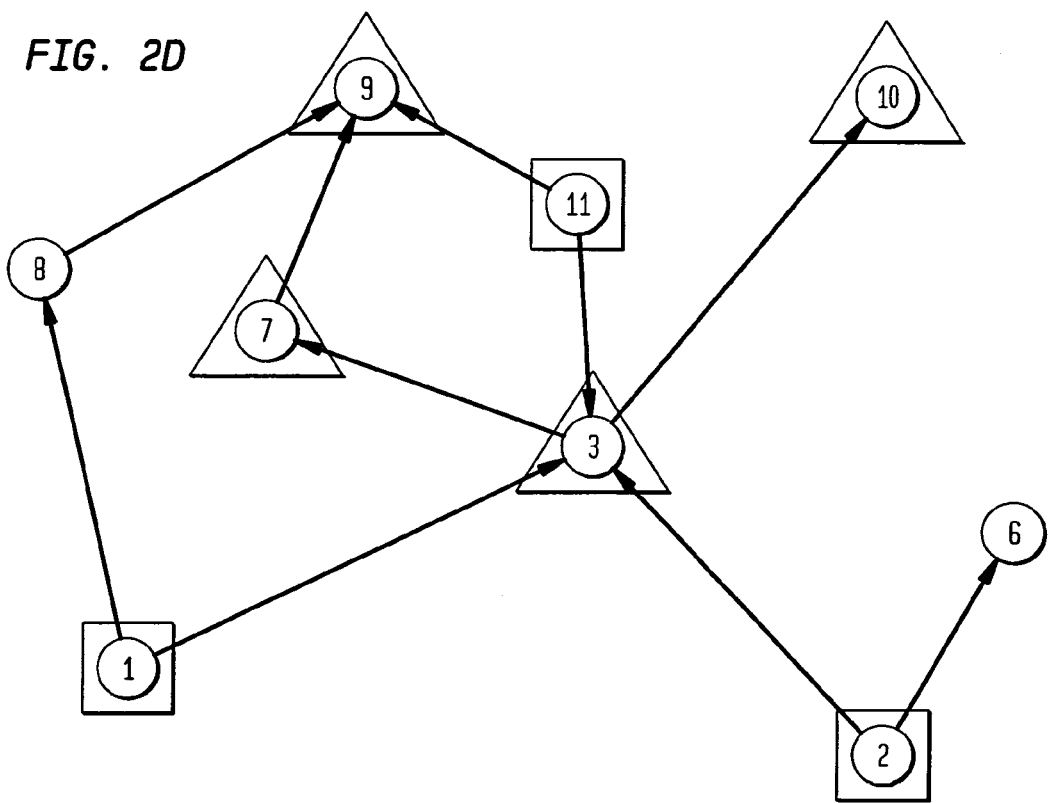
FIG. 2D shows certain nodes of FIG. 2C having been designated as problems (rectangles) and symptoms (triangles).
Figure 2E:
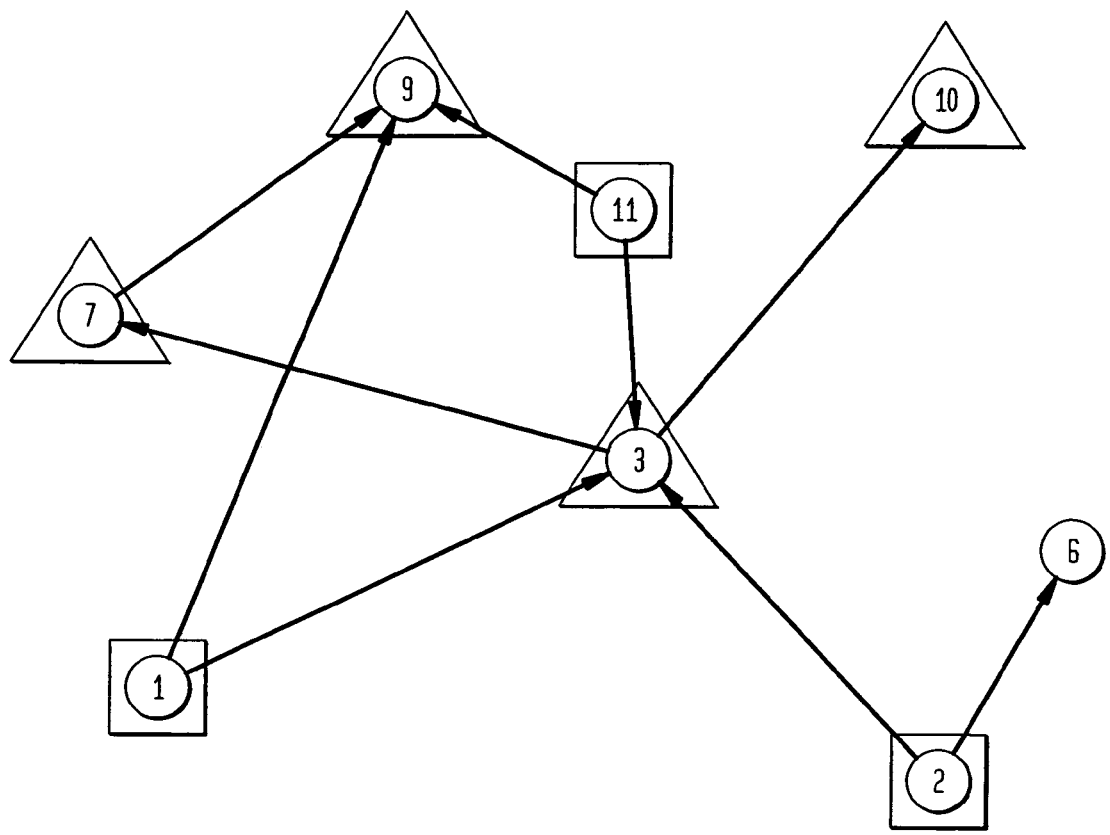
FIG. 2E shows a further simplification to the graph of FIG. 2D.

In accordance with this simplification, node 8 has been deleted from the causality graph of FIG. 2D in the simplified graph of FIG. 2E. All remaining nodes are now designated as either an observable symptom or a problem that requires handling.

The information in the simplified graph of FIG. 2E can now be represented in a correlation matrix as shown in FIG. 2F. The matrix of FIG. 2F contains columns corresponding to the problems of FIG. 2E and rows corresponding to the observable symptoms of FIG. 2E. In this matrix, a symptom is correlated with a problem if there is a causal path leading from the problem to the symptom. Thus, for example, problem 1 leads to (directly or indirectly) symptoms 3, 7, 9, and 10. Accordingly, these rows of column 1 are indicated with a "1" while remaining row 6 is indicated with a "0" because there is no causal relationship between problem 1 and symptom 6.

Because the correlation matrix of FIG. 2F may contain symptoms which do not contribute useful information for detecting problems, or it may contain problems that cannot be distinguished by the given symptoms, it is desirable to further reduce the correlation matrix to eliminate such non-informative rows and columns. The first simplification is to eliminate identical rows, because such rows indicate that the respective sets of symptoms provide identical information about the problems. For example, rows 3, 7, 9, and 10 of the correlation matrix in FIG. 2F contain identical information, and these redundant symptoms may be eliminated as shown in FIG. 2G and replaced with row 3 only.

The second simplification is to eliminate identical columns, because such columns indicate that the respective problems cannot be distinguished by the observed symptoms. Indistinguishable problems can be aggregated into a single abstract problem. This is particularly useful when a large collection of similar problems need to be handled in a similar manner. For example, various different problems with an Ethernet interface card (e.g., loose connector, defective collision-detection circuits) all lead to similar symptoms. The problem can therefore be generally abstracted as an "interface problem" and the correlation process will only identify that such a problem exists, but will not be able to determine which specific condition (loose connector or defective circuits) exists. Further resolution of the specific problem could then be pursued by running diagnostics. Where it is not acceptable to aggregate indistinguishable problems into abstract ones, new symptoms that yield distinct columns can be added. In accordance with the above described simplification, problems 1 and 11 in FIG. 2F have been aggregated into a "problem 1/11" in FIG. 2G.

After the foregoing steps, the correlation matrix of FIG. 2G is considered to be well formed because it has distinct rows and columns. Each column provides a distinct signature of the respective problem. A column vector will hereinafter be referred to as a "code" of the problem corresponding to the column representing the problem.

Generating an Optimal Codebook from a Well-Formed Correlation Matrix

A codebook is a set of symptoms whose respective rows in the correlation matrix provide a distinct code for every problem. The various data reductions described above can be used to convert a correlation matrix into such a codebook. However, the codebook may still contain a very large number of symptoms which contribute little to detecting or identifying problems (although the example outlined above is, of course, small). Therefore, additional mechanisms are needed to reduce the size of codebooks while providing optimal identification of problems.

One approach for further reducing the size of codebooks is to develop a measure of distance among codes and use this measure to determine the distinguishability among the codes. A process can then be used to generate codebooks that accomplish a desired level of distinguishability using a minimal set of symptoms.

The Hamming distance between two codes p and q is the number of coordinates where the two codes are not similar. This distance between problems p and q relative to a set of symptoms S (rows) will be referred to as $d_S$ (p,q). This distance measures the distinguishability between the codes of the respective problems for a given set of symptoms. The distance of a problem p from an entire set of problems P relative to a set of symptoms S will be designated as $d_S$ (p,P), which is the minimal distance between p and members of P for the given set of symptoms S. Moreover, $d_S$ (p,{ }), i.e., the distance of a problem p from an empty set, is infinite. Similarly, the radius of a set of problems P, denoted by $r_S$ (P), is the minimal distance between the codes of the set of problems P relative to a set of symptoms S. The radius measures the minimal (worst case) distinguishability between the codes of P.

Given a correlation matrix such as that in FIG. 2G, an optimal codebook can be generated by finding a minimal subset of the symptoms that provides an acceptable level of identification of the problems, where the radius provides a measure of the identification level. A codebook of a given radius is minimal if none of its symptoms can be eliminated without decreasing its radius.

To summarize, given a set of problems P, a well formed correlation matrix for P, and a distance measure d such that r(P)≧d where S is the set of symptoms of the correlation matrix, the objective is to find a minimal set of symptoms S'⊆S (codebook) such that $r_{S'}$(P)≧d. The creation of an optimal codebook may be performed in a "preprocessing" stage, which allows one to trade off computation time in creating the codebook for faster execution time during a decoding stage using the optimized codebook. The process for generating an optimal codebook in accordance with the aforementioned objectives will now be described with reference to FIG. 3.

Figure 3A:
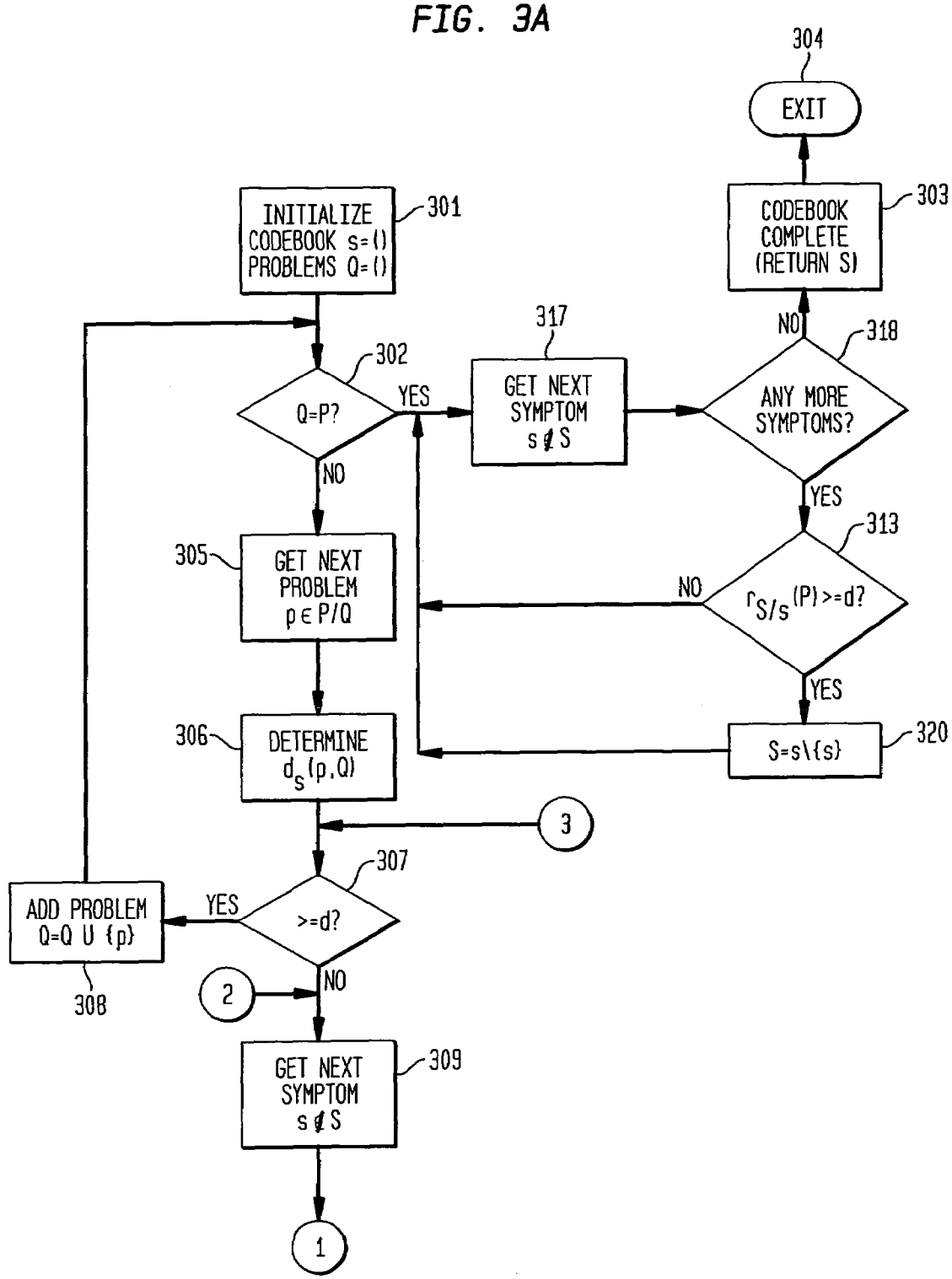
FIGS. 3A and 3B show a process for generating an optimized codebook in accordance with various embodiments of the invention.
Figure 3B:
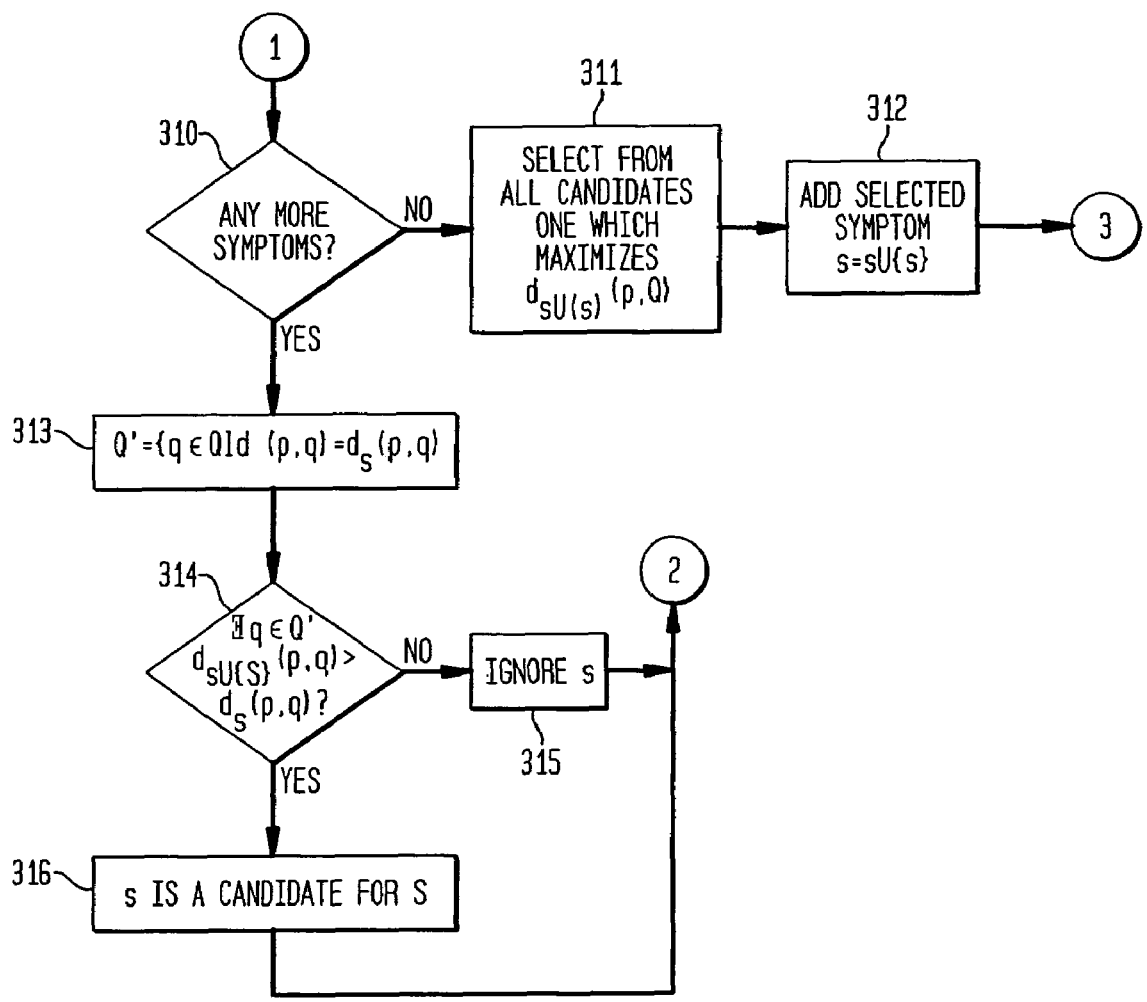

In step 301 of FIG. 3, the optimized codebook S is initialized to the null set (S={ }), and the set of problems in P (from the well-formed correlation matrix) covered by the codebook is also initialized to the null set (Q={ }). In step 302, a test is made to determine whether the problems covered by the codebook are identical to the problems covered by the well-formed correlation matrix. If all the problems are covered by the codebook S, the process continues to step 317 to generate the optimized codebook S by eliminating symptoms from S while maintaining the radius above the required one d. Accordingly, step 317 is executed in which the next symptom s (not already examined) is retrieved from S. In step 318, if there are no more symptoms, i.e., all the symptoms in S have been examined, the codebook S is considered to be complete and minimal in step 303 and the process terminates and exits at step 304, the optimized codebook being represented by S. Otherwise, if there are more symptoms, the process continues to step 319, in which the radius of the set of problems P relative to codebook S minus the symptom s is compared to the required distance d. If the radius is not smaller than d, the symptom s is removed from S in step 320. In any case, the process iterates to step 317. If in step 302 not all problems are covered by the codebook S, the process continues to step 305.

At step 305, the next problem p is selected from the problem set P\Q, and the Hamming distance between this problem and the problem set Q covered by the optimized codebook is determined in step 306. In step 307, if this distance is greater than or equal to the specified distance measure d, then problem p is added to the set of problems covered by the codebook in step 308 (i.e., Q=Q∪{p}) and processing resumes at step 302. Executing step 308 indicates that the codebook S already distinguishes p from Q by an appropriate distance.

If the determined Hamming distance is not greater than or equal to the distance measure d in step 307, this indicates that the codebook S does not provide sufficient distinction for problem p and needs to be extended to meet the desired quality measure d. Accordingly, step 309 is executed, in which the next symptom s (not already covered in S) is retrieved from the well-formed correlation matrix. In step 310, if there are no more symptoms, this indicates that all the symptoms not included in optimized codebook S have been examined, and step 311 is executed. In step 311, one symptom is selected from all the candidates previously generated in step 316 (discussed below), the one selected being the one which maximizes the distance $d_{S\cup\{s\}}$ (p,Q). This selected symptom is added to S (i.e., S=S∪{s}) and processing resumes at step 307.

If, on the other hand, there are more symptoms to consider in step 310, the subset of problems Q' of Q is determined in step 313. Q' is the subset of problems of Q such that the Hamming distance of every problem q∈Q' from p relative to the codebook S, $d_S$ (p,q), is equal to the Hamming distance of p from the entire set of problems Q, $d_S$ (p,q). Then, s can be a candidate only if by adding it to the codebook S the distance of p from a member of Q' increases. Hence, in step 314, a search for a problem q∈Q' such that $d_{S\cup\{s\}}$ (p,q)>$d_S$ (p,q) is performed. If such q does not exist, the symptom s is ignored (step 315). Otherwise, s is considered to be a candidate for S in step 316, and processing resumes at step 309.

The above process can be used to generate an optimal codebook from a well-formed correlation matrix. The process is finite due to the specified restriction r(P)≧d. When the process terminates at step 304, the set Q equals the set P and all problems are covered by the optimal codebook S. Moreover, the optimal codebook S satisfies the distinguishing criterion d≦$r_S$ (P) and is minimal. The complexity of the process is polynomial in the number of problems and symptoms.

The process can be incrementally applied with minor variations to handle additional new problems by simply extending the codebook to cover the new problems. There is no need to regenerate the entire codebook. Similarly, if certain symptoms become unavailable, they may be replaced with new symptoms by extending the codebook rather than regenerating it. This flexibility to handle changes in the codebook may be important in an environment where the problems of interest and the observable symptoms can vary. Distance measures other than Hamming distances can, of course, be used, and the invention is not limited in this regard.

The above discussion explains how to generate a codebook from a causality graph by first generating a causality matrix and then selecting a codebook. It will be recognized, however, that a codebook can be generated directly from a causality graph without first generating a causality matrix. As outlined above, the following mappings can be made between a causality graph and a causality matrix:

| GRAPH | CAUSALITY MATRIX |
| --- | --- |
| symptom node | row |
| problem node | column |
| directed path from event to a problem node | matrix cell |
| weight on path | probability (Correlation symbol) |
| set of symptom nodes reachable from a problem node via directed paths. S(P) = symptoms of P. | code of a problem |
| size of difference among two sets of nodes \|S(P1) Δ S(p2)\| | Hamming distance among codes |
| a minimal difference set among symptoms set of two problems. r = Min{\|S(p1) Δ S(p2)\|; p1, p2} | radius |

The mappings above can also be used to generate a codebook directly from a graph by mimicking the process for the causality matrix. Thus, direct generation of the codebook can be performed by the following steps:

(1) Simplify the causality graph as explained with reference to FIGS. 2A to 2E.

(2) Eliminate redundant nodes (problems and symptoms) from the causality graph. Two symptom nodes are distinguishable if they share the same set of problems that lead to them via directed paths. Two problem nodes are distinguishable if they lead via directed paths to the same set of symptoms. Thus, problem and symptom nodes that are redundant because of indistinguishability are eliminated.

(3) Select symptoms that distinguish problems to within a given desired distance.

Expanding Codebooks to Include Probabilistic and Temporal Codes

In many cases, symptoms may be randomly caused by problem events. A probabilistic correlation model is a matrix which contains for each problem p (column) and each symptom s (row) the conditional probability that s will be caused by p. This is really just a special case of the general model outlined previously where the probabilities were 0 or 1. Where it is difficult to obtain accurate estimates of the probabilities, discrete probability values such as high (h), medium (m), or low (l) may be used to indicate relative probability levels. That is, the elements of the correlation matrix may take on values from the set {h,m,l}.

Temporal correlations among events may also be indicated by values which represent a time period from the occurrence of the problem until generation of the symptom. Additionally, temporal correlations among symptoms may also be specified. In either case, a discrete measure from the set comprising {l (long), m (medium), s (short), 0 (never)} may be used.

The above correlation measures may be combined to refine the correlation model. For example, the correlation matrix may include pairs of the form {Pr, t} where Pr is a probability indication from {h,m,l} and t is a time indication from (l,m,s,0). The pair (h,s) in the correlation matrix would indicate that the respective problem may cause the symptom with high probability over a short time window.

A generalized correlation model may be defined to include:

a set of problem events P and a set of symptom events S a set of correlation indicators I a correlation matrix whose columns correspond to members of P, whose rows correspond to members of S, and whose elements are indicators from I.

a distance measure $\delta: I \times I \rightarrow \mathcal{R}^+$ where $\mathcal{R}^+$ is the set of non-negative real numbers. This measure $\delta$ provides the distance (a similarity measure) between two correlation indicators.

For example, the deterministic correlation model described above is obtained when the set of indicators is I={0,1} and the Hamming distance (a similarity measure) function is given by the relation:

| $\delta_H$ | 0 | 1 |
| --- | --- | --- |
| 0 | 0 | 1 |
| 1 | 1 | 0 | where the columns and rows represent the indicator symbol and the numbers in the matrix represent the respective Hamming distance measure. Note that absence of a symptom (0) perfectly matches absence of a symptom (0) and therefore has no mismatch (0).

Given a generalized correlation model, the code of a problem p is the vector of indicator values of the respective correlation matrix column. The distance between two such codes p and q is given by the following function:

$d_S(p,q) = \Sigma_{s \in S} \delta(p_s, q_s)$ where $p_s$ is the coordinate of p corresponding to the symptom s, that is, the component of the correlation matrix in column p and row s. In the case of the deterministic correlation model, the distance between two codes, determined using $\delta_H$ in the table above, is the number of coordinates where the vectors have different components.

Once a distance function between codes is defined, the definition of radius described previously can be applied. Therefore, the codebook generation problem and process described above can be generalized, and the process of FIG. 3 can be used for a generalized correlation model when the appropriate distance function is used.

An example will now be provided to illustrate how this generalization can be applied to solve the problem of generating a codebook for a probabilistic correlation model.

Assuming a correlation matrix which uses indicators from the set I={h,m,l} for high, medium or low probability, the following is an example of a distance measure (measure of mismatch) which can be used:

| δ | 1 | m | h |
|---|---|---|---|
| 1 | 0 | α | 1 |
| m | α | 0 | β |
| h | 1 | β | 0 |

In the above example, the factors $0 \leq \alpha, (\beta) 1$ measure the similarity between medium and low probability (respectively, high and medium probability). A possible choice, for example, is $\alpha=\beta=0.5$.

The above defines a distance measure among probabilistic codes. For example, consider the following two codes for problems using a codebook of 6 observed symptoms:

p=(1,1,h,m,m,h)
q=(m,l,m,h,l,l)
d(p,q)=δ (1,m)+δ (1,l)+δ (h,m)+δ (m,h)+
δ (m,l)+δ (h,l)=0.5+0+0.5+0.5+0.5+1=3.

By selecting various measures of similarity, different strategies can be reflected to measure distinction between codes. For example, in distinguishing among codes, all symptoms having a medium probability of occurring can be ignored. This would be reflected by setting $\alpha=\beta=0$. The distance between p and q in the above example would thus become:

d(p,q)=0+0+0+0+0+1=1.

This distance reflects coordinates where one problem is very likely to show a symptom while the other problem is unlikely to show the symptom. Coordinates where symptoms provide uncertain signals are ignored. The codebook generation process as described above will yield a minimal one whose codes are sufficiently distinct in the sense of distance between probabilistic codes defined above.

Of course, in the real world, many probabilistic correlations may be unknown, and the model cannot be tailored to take advantage of these relationships as described above. However, one of ordinary skill in the art will recognize that the correlation model can be easily tailored to accommodate different systems and make use of all available information as needed to practice this aspect of the invention.

Performing Correlation Through Decoding

Once an optimal codebook for a given set of problems and symptoms has been generated as outlined above, the optimal codebook can be used to decode symptoms which occur during system operation and to generate reports indicating detected and/or identified problems (see FIG. 1A). The event decoder 10 of FIG. 1A classifies a vector of observed symptoms into the most appropriate code. Generally, symptoms are either observed or not observed, but the principles of the invention are easily applied to probabilistic determinations where observations are uncertain.

For example, suppose that a codebook contains 6 symptoms. An observation described by a=(0,0,1,0,1,1) indicates that symptoms 3, 5, and 6 were deed while the other symptoms did not occur. Assuming there is no problem whose code is an exact match for a, the codes of problems p and q, given by p=(0,0,1,0,0,1) and q=(1,0,1,0,1,1) are very similar to a. In a real system, symptoms may be lost or generated spuriously, so it is necessary for the decoding process to find the "best fit" problem even though none matches exactly the set of symptoms. One method of finding the "best fit" problem is to use a mismatch measure.

The Hamming distances between the two observed symptom vectors d(p,a)=d(q,a)=1 are identical since both codes differ from the observation vector in one symptom only (5 for p and 1 for q), However, there is an important difference between p and q with respect to their similarity to a. The observation a could be caused by p if symptom 5 were lost, but for q to be the cause of the observation a, symptom 1 would have to be spuriously generated, which in most systems is less likely than losing messages. The concept of a mismatch measure can help capture this likelihood to determine which problem is a better match for a given set of symptoms. Event decoder 10 of FIG. 1A would thus be able to select p as the more likely explanation of the observation a.

A mismatch measure can be defined as a function $\partial:\{0,1\} \times I \rightarrow \mathcal{R}^+$ which assigns to a symptom (1 if the symptom is observed, 0 if it is not observed) and a corresponding correlation indicator i, a measure of mismatch between the observation and a code. The value of $\partial$ (1,i) measures the mismatch between an observation of a symptom and a code where it occurs with correlation i. Similarly, $\partial$ (0,i) measures the mismatch between the lack of observation of a symptom and a code where it occurs with correlation i.

For example, in the deterministic correlation model I={0, 1}, if an observed symptom matches the expectation of a code (i.e., it matches that symptom's entry in the codebook), then the degree of mismatch is given by $\partial$ (1,1)=$\partial$ (0,0)=0. This means that if the code expects the symptom to occur (or not to occur) and it is observed (or is not observed), there is a perfect match between the observation and the code. If the code expects a symptom to occur but the symptom is not observed (e.g., due to loss), the measure of mismatch $\partial$ (0,1)=α assigns a weight to loss of the symptom. Similarly, a spurious generation of a symptom not anticipated by a code will carry a mismatch measure of $\partial$ (1,0)=β. If α is chosen to be smaller than β, this would indicate a greater mismatch for a spurious event.

Mismatch measures may be described using tables in a manner similar to distance measures. Columns represent correlation symbols, while rows represent observations {0,1}. For example, the mismatch measure for the deterministic model is given below:

| ∂ | 0 | 1 |
|---|---|---|
| 0 | 0 | α |
| 1 | β | 0 |

For a probabilistic correlation model, a possible mismatch measure is given by:

| δ | 1 | m | h |
|---|---|---|---|
| 0 | 0 | 0 | α |
| 1 | β | 0 | 0 |

The above mismatch measure can be interpreted as follows. When a code expects a symptom with low or medium probability, absence of the symptom has no mismatch with predictions $\partial$ (0,1)=$\partial$(0,m)=0. When the code expects a symptom with high probability, absence of a symptom has a mismatch of level α Similarly, occurrence of a symptom expected with high or medium probability matches the expectation, while occurrence of a symptom expected with low probability represents a mismatch of level β.

A mismatch measure m can be defined between an observation vector a and code p as the sum of the mismatch measures between respective coordinates:

$m_S(a,p) = \Sum_{s \in S} \partial(a_S, p_S)$

This mismatch measure represents the degree to which the observed and absent symptoms of a match the code of p. It is expressly understood that the term "mismatch measure" can be more generally referred to as a correlation measure or correlation distance without limiting its application in the present invention. The above described tables can thus be replaced by measures of correlation (similarity) to produce die same results.

A decoder for a correlation model over a codebook S can be defined as a process that maps an observation a to the set of problems whose codes have minimal mismatch with a. Thus, given a codebook S, a set of problems P with codes over S, and a mismatch measure $m_S$, an input observation a over S will be decoded, and an output will be generated corresponding to all problems p that minimize $m_S$ over P. With reference to FIG. 4, the decoding process will now be described in detail in accordance with the above objectives.

In step 401, Q (the set of problems to be considered) is initialized to P, P* (the set of decoded problems) is initialized to the null set, and m* (the minimal mismatch) is initialized to infinity. In step 402, a test is made to see if the set of problems to be considered has been exhausted. If so, step 403 is executed, in which all decoded problems are returned and the process exits in step 404.

Assuming there are still problems to be considered, in step 405 a problem is selected from Q and the problem is removed from Q. In step 406, the mismatch $m_S(a,p)$ is determined between the observed vector a and the problem p as described previously. In step 407, the determined mismatch is compared with the current minimal mismatch m*. If the newly determined mismatch is less than the current minimal mismatch, then step 408 is executed. In step 408, a new value for m* is assigned corresponding to the newly determined mismatch, and the problem p corresponding thereto is inserted into P* (i.e., the decoded problem set). Processing then resumes at step 402.

If, in step 407, the determined mismatch is not less than the current minimum mismatch value, a test is performed in step 409 to determine whether the determined mismatch is equal to the current minimum mismatch value. If they are equal, step 410 is executed, in which the problem p is added to the decoded problem set P*. It will be noted that multiple problems could have the same degree of mismatch and thus more than one problem could be inserted into P* in this instance.

Finally, if the newly determined mismatch is not equal to the current minimal mismatch m* in step 409, the only remaining possibility is that it is greater than mi (step 411). In this case, processing resumes at step 402. When all problems have been considered, the decoded problem set P* is generated as an output in step 403.

The complexity of the above process is determined by step 406. The mismatch measure requires additions of |S| terms and then this is repeated |P| times, so the overall complexity is of the order |P| |S| additions and |P| comparisons. The process is suitable for executing in real-time and, due to the reduced complexity and amount of data in the optimized codebook, the amount of computation over other approaches is greatly reduced. Particularly in very large and complex systems, the increase in performance can be substantial.

The decoding process can be modified slightly to identify, instead of "best fit" matches for a given observation, codes which match the observation up to a particular level of tolerance from the "best" mismatch. That is, a level of tolerance T can be set and all codes that are within a mismatch of T above the minimum mismatch will result in the corresponding problem being output as part of the decoded problem set P*. To accomplish this, steps 407 and 409 of FIG. 4 would be modified slightly to compare $m_S(a,p)$ with m*+T rather than m*.

To summarize the above description of the decoding process, the steps in FIG. 4 determine the minimally mismatched codes that would explain a given observation vector. The measure of mismatch used can be selected to reflect a variety of considerations and sensitivities specific to a given system. Due to the simplicity of the decoding process (i.e., involving simple operations such as additions and comparisons), the process can be executed very fast and in real time.

A Specific Example Illustrating Various Aspects of the Invention

Figures 4B, 5A:
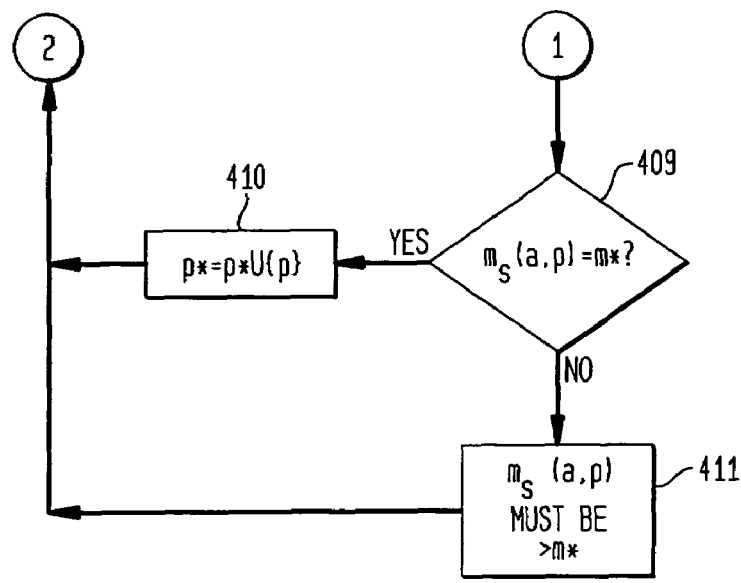

In order to more clearly illustrate the principles of the present invention, a specific example will now be described in detail with reference to FIGS. 5A to 5E. FIG. 5A shows a well-formed deterministic correlation matrix (i.e., all problems cause certain symptoms with certainty) for 6 problems P producing 20 symptoms S. The Hamming radius for these problems is r(P)=7 (i.e., the minimal distance of 7 is obtained between problems 1 and 3 and between problems 2 and 3). One can thus generate optimal codebooks for P that accomplish a Hamming distance of up to 7.

FIG. 5B shows the generation of an optimal codebook with a target distance measure of d=1. Assuming that the problems are considered in order of 1 to 6 and symptoms are considered in order from 1 to 20, FIG. 5B shows seven "snapshots" of codebook S and problem set Q as the process illustrated in FIG. 3 is performed. At the seventh snapshot in FIG. 5B, the optimal codebook is complete with $S_1 = \{1,3,4\}$ and a corresponding matrix as shown in FIG. 5C. Thus, the correlation matrix of FIG. 5A has been simplified to that of FIG. 5C for a distance measure of 1.

As another example, FIG. 5D shows an optimal matrix for the same correlation matrix of FIG. 5A (codebook $S_2 = \{1, 2,3,10,15\}$) generated with a radius of 2 instead of 1. This illustrates how even small codebooks can be optimized to accomplish a significant level of distinction.

In order to perform decoding using either codebook $S_1$ or $S_2$, a sample mismatch measure shown in FIG. 5E will be used starting with $\alpha=1$ and $\beta=10$ (this is sufficiently large to prefer lost symptoms to spurious ones in selecting codes). Assuming that codebook S.sub.1 is used, note that there is only one combination of symptoms which does not directly match one of the problems (i.e., there will be only one mismatch), which is a=(0,0,1). The trivial observation vector a=(0,0,0) is always excluded. Using the values of $\alpha=1$ and $\beta=10$, the mismatch measures of a with the codes of the 6 problems are given by 2, 11, 12, 11, 1, 1. In this case, problems 2, 3, and 4 would require a spurious generation of symptom 4 to generate a. Since spurious events are penalized with a high mismatch level ($\beta=10$), these codes are greatly mismatched with a. The decoding process will thus result in $\{P_5, P_6\}$ returned as the "best" decoding of symptom vector a. Thus, either problem 5 or problem 6 could have generated the observation through the loss of a single symptom.

The above example will now be repeated for codebook $S_2$. With the 5 symptoms shown in FIG. 5D, the number of possible non-trivial observations is 31, of which only 6 are exact codes. Considering first observations resulting from the loss of 1 symptom in the codes, since the distance among the codes in FIG. 5D is at least 2, none of these observations can be a code. This set includes the following 15 observations: {11000, 10100, 01100, 00110, 01010, 01111, 10111, 11011, 11101, 11110, 10010, 00011, 00101, 00001, 10000}. These observations will be decoded into the codes at distance 1 from which a symptom is lost. This means that at most two codes will be decoded from these observations.

Considering observations generated when two symptoms are lost, this set includes the 10 observations {00100, 00010, 01000, 10101, 10011, 11001, 10110, 01110, 01101, 01011}. The first 3 may be generated by multiple codes, while the remaining 7 may only be generated from the code for problem 3 by deleting two symptoms. That is, each of these 7 observations will be decoded as problem 3.

Figure 6:
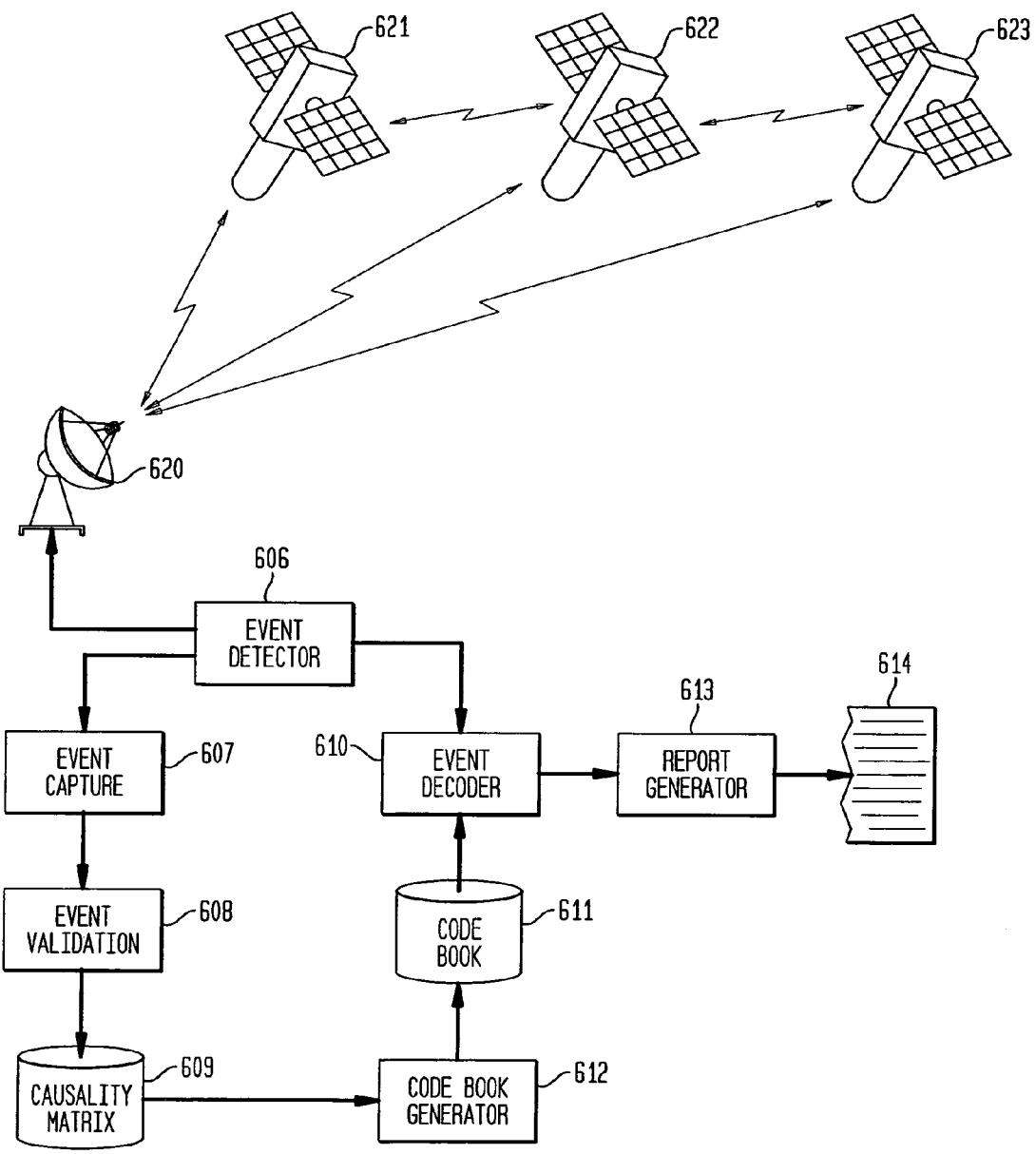
FIG. 6 is a block diagram showing how the principles of the present invention can be applied to a satellite system.

FIG. 6 shows how the principles of the present invention can be applied in a system which includes satellites communicating with a ground station. In FIG. 6, elements 606 to 613 perform functions identically or similar to those of elements 6 to 13 in FIG. 1A. A ground station 620 communicates with a plurality of satellites 621, 622 and 623 by way of radio wave propagation. Each satellite may typically comprise numerous processing components including sensors and devices which may generate symptoms such as low power, device failures, and the like. These symptoms can be transmitted to ground station 629, which is connected to event detector 606. In accordance with the detailed explanation previously provided, the invention decodes events which occur during system operation and generates a report 614 corresponding to the one or more likely problems in the system. Because the number of events in the system of satellites can be quite large and the relationships among events complex, the data reduction principles of the present invention can result in significant performance advantages over conventional approaches.

The satellites shown in FIG. 6 may comprise a telecommunication system, for example. Instead of satellites, elements 621–623 may instead comprise ground-based telecommunication nodes having switches and multiplexors which may generate symptoms.

Figure 7:
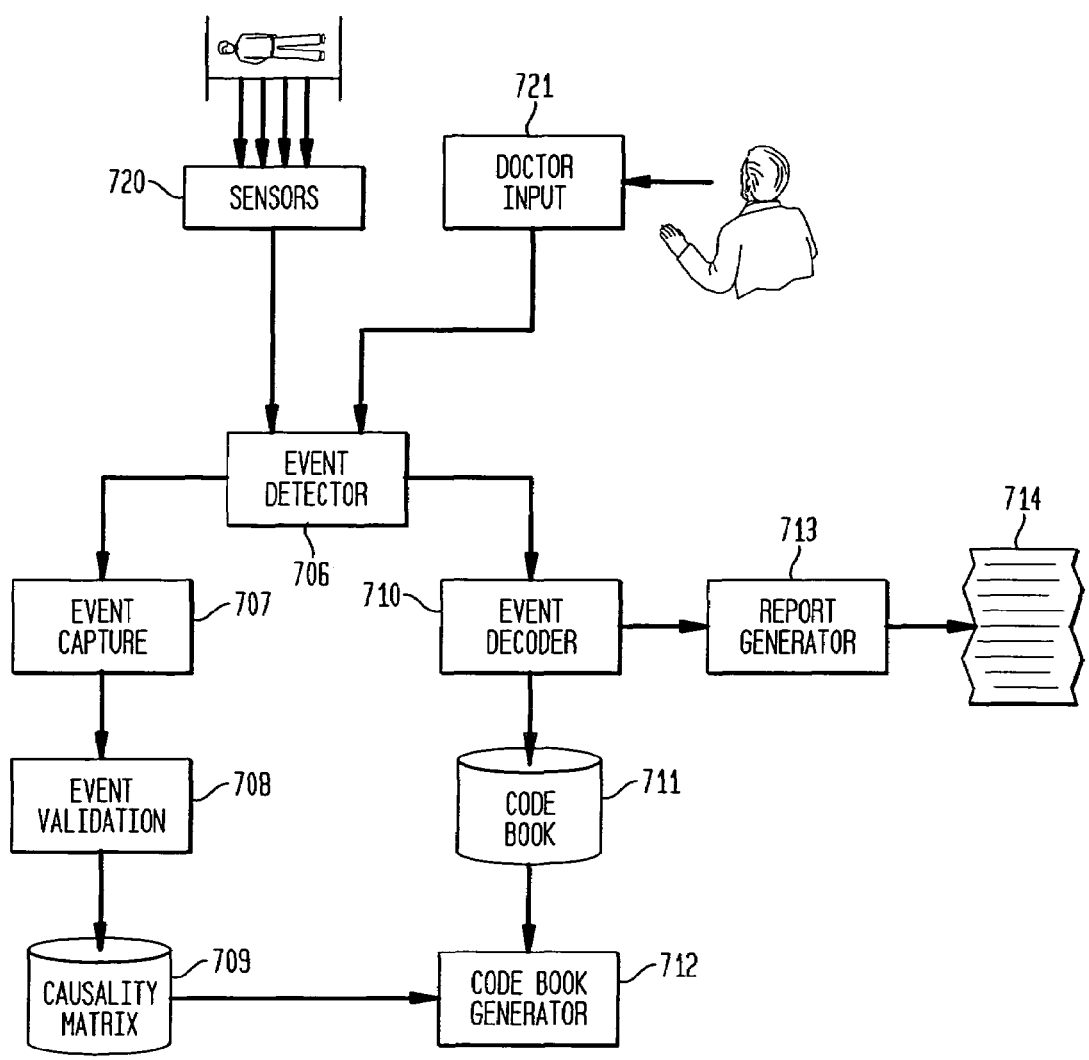
FIG. 7 is a block diagram showing how the principles of the present invention can be applied to medical diagnosis of patient symptoms.

FIG. 7 shows how the principles of the present invention can be applied in medical diagnosis applications. Elements 706 to 713 perform the same or similar functions as elements 6 to 13 of FIG. 1. One or more sensors 720 may receive symptoms from a patient such as temperature, blood pressure, chemical levels, breathing rate, and the like. Moreover, a doctor may manually enter other symptoms through input means 721, such as through a menu. These symptoms could include not only those directly observable such as skin color, pain locations and the like, but could also include derived symptoms such as partial diagnoses based on the doctor's own knowledge or suspicions. Symptoms from sensors 720 and input means 721 are fed to event detector 706 in a manner similar to that for other embodiments of the invention. Based on the observed symptoms, the invention produces a report 714 or other indication of the likely diagnosis, such as on a graphics display or the like.

The apparatus of FIG. 7 may also be used to analyze financial market events by replacing sensors 720 with an appropriate data collection device (such as a computer program or other statistical filtering device) to compile prices, ratios, trends, etc. into events for event detector 706. In place of doctor input 721, an input device suitable for receiving human-observable events may be provided so that a market analyst may input such events.

It is possible to use an alternative decoding process that is entirely built upon table lookup. A perturbation analysis can be undertaken to divide all possible observations into appropriate classes. For each such perturbation, one can determine all codes from which it obtains. The decoding table may be generated in advance, and decoding becomes a simple and fast table lookup process. This is particularly useful when the code is efficient. The size of the lookup table could be $2^{|S|}$. In general, this may be very large. However, for efficient codes, $|S| \sim \log |P|$ and, therefore, the size of the lookup table is of a similar order as $|P|$.

If the codebook has a large radius, the codes could admit significant perturbations while accomplishing unique decoding. This is entirely analogous to the design of error-correcting codes. With sufficient redundancy in the codebook, decoding can be very robust to lost or spuriously generated symptoms.

The larger the radius of the codebook, the smaller the number of ambiguous observations that will exist. When the radius is r, the number of observations that decode into a given code is approximately $2^{r/2}$, leading to a total of some $|P|^{r/2}$ points that decode unambiguously.

This represents a fraction of the observations space of approximately $|P| 2^{r/2-|S|}$. When $|P| \approx \log(|S|-r/2)$, then most problems will be decoded unambiguously.

In summary, the principles of the invention outlined herein offer significant advantages over other approaches to event correlation and management, including the following:

(1) Real-time correlation computations are reduced significantly by preprocessing event knowledge to generate codebooks prior to real-time event detection and correlation. This is in contrast to typical event correlation systems based on artificial intelligence techniques which conduct indefinite searches during real time to correlate events. In extremely large and complex systems, the reduction in real-time processing requirements can significantly reduce the amount of hardware required and can result in faster problem diagnosis.

(2) A wide range of correlation models can be used and tuned (through a choice of correlation indicators, distance and mismatch measures) to achieve different strategies for correlation while using the same generalized process.

(3) The set of events to be monitored can be narrowed to only those that provide the highest information benefit, rather than arbitrarily monitoring all possible events, or an ad hoc set of events. This reduces the complexity of the correlation process and minimizes the waste of computer processing resources.

(4) The instrumentalities of the invention can be implemented with a relatively small set of code that can be operated on a single computer.

Generation of Causality Matrices

In addition to creating causality matrices manually, they may be generated through the use of a formalized language which verifies various data relationships and creates a matrix, or they may be created semi-automatically using statistical analysis and filtering using well-known techniques. Thus, event capture 7 and event validation 8 shown in FIG. 1A may be used to generate causality matrix 9 using either approach shown in FIG. 8, as described in more detail below.

Figure 8:
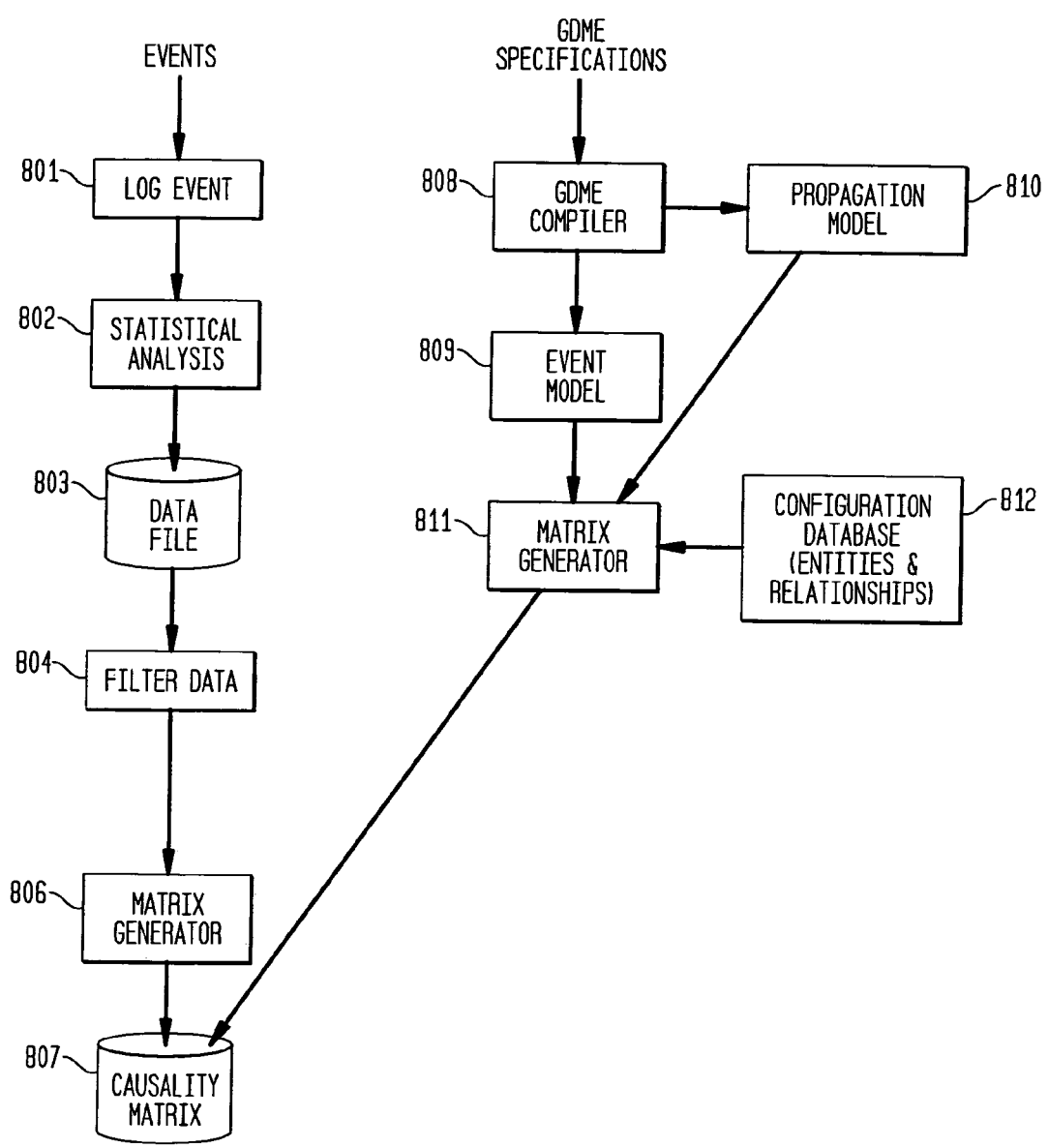
FIG. 8 shows how a causality matrix may be generated either through a semi-automatic process or through a systematic process using event/propagation model specifications (such as GDME specifications which are compiled), and a specification of the system configuration.

The left side of FIG. 8 shows how events which result from event detector 6 (see FIG. 1A) may be processed using elements 801 through 806 to generate causality matrix 807 (these elements also illustrate the process which may be used). Alternatively, the right side of FIG. 8 shows how causality matrix 807 may be generated from an event model 809, an event propagation model 810, and a configuration specification 812. The latter approach provides significant benefits in that a formal, automatable process is provided for generating causality matrix 807 for a dynamically changing system from static event knowledge associated with the types of components in the system and the dynamic specification of a particular configuration. Either approach may be implemented using computer software and corresponding data files, and the resulting causality matrix 807 may be stored in a storage device such as a computer disk for later access. Of course, variations on the approach shown in FIG. 8 are possible, and the two illustrated are not intended to limit the scope of the invention.

Beginning with the left side of FIG. 8, events received from event detector 6 (see FIG. 1A) are logged in event logger 801. This element may time-stamp the event and record "what happened"; for example, a disk drive error in one of the networked computer nodes illustrated in FIG. 1A. These events may be stored in an intermediate data file (not shown) for statistical analysis by element 802. Statistical analysis 802 analyzes the data produced by element 801 to identify correlations among events, and may be performed either in quasi-real time or in an off-line mode using historical data collected over a long period of time. Statistical analysis 802 may be performed using any well-known method, such as multiple linear regression analysis, and a detailed explanation of these well-known methods is not provided here. The purpose of element 802 is to identify correlations among events which are detected in the system (i.e., identify events that occur in pairs, where one event probably causes another event), and to store the correlation information into a data file 803.

After correlations among events are stored in data file 803, a filter 804 is applied to this data to remove weakly correlated data. This may be done by allowing a user to specify a particular correlation threshold or any other means to weed out weakly correlated events. The filtered data is then formatted into causality matrix 807 through the use of matrix generator 806 in accordance with the description of this matrix as previously described. Each of these operations can be programmed easily using a digital computer and any suitable computer language, such as C, FORTRAN, or LISP.

Referring now to the right hand side of FIG. 8, a process and means for creating causality matrix 807 by applying an event model 809, an event propagation model 810, and a particular system configuration 812 will be described. The GDME specifications shown in FIG. 8 represent one possible embodiment of a formal language for specifying the event and propagation models. Such a language may be processed by a compiler 808, such as a GDFME compiler which reads "statements" read from a file or entered by a user. Other possible embodiments include languages with a different syntax from that described herein, different data structures, graphical representations, or any other means of specifying the static information in event model 809 and propagation model 810.

Any particular system monitored using the principles of the present invention can be characterized by a domain consisting of a set of objects (hardware, software, communications or others) which can generate events. These objects within the domain will be called event source objects (ESOs), indicating that each such object can be the source of one or more events. Each ESO can be characterized as belonging to a particular class, and each can be related to other ESOs via certain relationships. For example, a power supply object may be related to a CPU board object via the relationship "provides-power-to". Events may propagate among such relationships. For example, a problem event in the power supply may cause symptom events (as well as problem events) at the CPU board and other objects to which it "provides-power-to".

The information required to analyze events can be divided into two kinds:

(1) Generic knowledge about events associated with ESO classes. This knowledge may comprise an event model and an event propagation model which can be provided by the designer of each component at design time. The class to which an ESO belongs determines the set of exceptional events (problems) that may occur in the component, the local symptoms they cause, and the probability that they may cause these local symptoms. This information constitutes the event model for the class. The class to which an ESO belongs also may determine the set of relationships that ESOs of the class may participate in. Events may propagate along relationships to and from related ESOS. For example, the knowledge of various events of a power supply component and the manner in which these events may cause events occurring at ESOs to which the component "provides-power-to". This knowledge is typically generic to various types (classes) of ESOs. The specification of which class events may propagate along which relationships constitutes the event propagation model for the class.

(2) Specific knowledge about the set of specific instances of ESOs in a domain, and their specific relationships. For example, a given domain may include 14 workstations, each of which contains an instance of a power supply object and of various boards which this specific power supply object "provides-power-to" This data is assumed to be organized into a configuration specification for the particular domain, illustrated by element 812 in FIG. 8. Any data representation may be used to store this data, such as a memory data structure, a file, an object-oriented database, or others. Matrix generator 811 generates causality matrix 807 by interpreting event and propagation models 809 and 810, respectively, in a domain specified by configuration specification 812. This process may be performed either with compiler 808 using compilable statements or specifications (as described in more detail herein), or directly from even model 809 and propagation model 810. The interpretation may be performed as follows:

(a) Determine the set of all events (exceptional and observable) that can occur in the specific configuration. Each object in the configuration may generate any of the events specified for its class in the event model. The set of event in a given configuration is thus the union of all events that can be generated by all the objects in that configuration.

(b) Determine the causality closure. For every event in the set determined in step (a) above, the causality closure is the union of all observable events the event may cause and the probability it may cause each of them. This causality closure may be determined through the following recursive steps:

(1) If the event is an observable event then its causality closure is the single element set consisting of the event itself.

(2) If the event is specified as an event that may cause a set of symptoms $S_1 \ldots S_m$, then the causality closure of that event is the union of the causality closures of $S_i$, where i= 1 . . . m.

(3) If the event is specified in the propagation model as an event that can propagate via certain relationships, and the configuration specifies that the object generating this event is related to object $o_i \ldots o_n$ on via those relationships, then the causality closure of that event is the union of the causality closures of the corresponding imported events in $o_i$, where i=1 . . . n.

As illustrated in FIG. 8, GDME specifications may be input to compiler 808 in FIG. 8 in various embodiments of the invention as described in more detail below. However, alternative forms of specifications may be used, such as graphical representations, and the invention is not intended to be limited in this regard. In various preferred embodiments, the GDME specifications may comprise the following compilable statements input to compiler 808:

INTERFACE statement defines a class of event source objects and provides the start of a definition block. All statements between an INTERFACE statement and an END statement are associated with a definition block. A preferred statement syntax is:

INTERFACE class-name DERIVED-FROM parent-class-name;

where class-name is alphanumeric name of the new type of objects being defined, and parent-class-name is an is alphanumeric name of the generic type of objects the new class inherits from. The parent class must be either a "basic" class of the data model or a previously defined class.

ATTRIBUTE statement: specifies an attribute, property and/or real-time measurement of an object. A preferred syntax for this statement is:

ATTRIBUTE attribute-type attribute-name;

where attribute-name is an alphanumeric name of an attribute which is unique within the scope of the definition block, and attribute-type is the one of the pre-defined set of basic types.

EVENT statement: specifies an event that might be generated by objects in the class. Each event is specified by an EVENT statement as a Boolean expression on properties of the class or as a user function. A preferred statement syntax is:

EVENT event-name MEANS description IS expression;

where event-name is an alphanumeric name of an event unique within the scope of the definition block, description is quoted free text that describes the event and/or associates an action with it (intended for presentation to human operators), and expression is either a Boolean expression in terms of the object's attributes and events or a function name to be used to detect the event.

IMPORT statement: specifies an event that an object in the class may import from another object. The event may propagate from an object of this class to other objects via one of the relationships that exists between the respective objects. A preferred statement syntax for this statement is:

IMPORT event-name MEANS description
FROM class-name VIA relationship-name
WHERE imported-event-name;

where event-name is an alphanumeric name associated with the imported event used to uniquely identify the event within the scope of the definition block; description is a quoted free text string that describes the event and/or associates an action with it (a programmed action or one intended to be presented to human operators); class-name is an alphanumeric name of the class from which the following events are imported; relationship-name is an alphanumeric name of one of the relationship attributes of this class; and imported-event-name is an alphanumeric name of an event being imported from the specified class.

CAUSALITY statement: specifies a problem which may cause a set of observable events in the instances of the class. Observable events are those specified by an EVENT or IMPORT statement. A preferred syntax is:

PROBLEM problem-name MEANS description CAUSES symptom WITH probability;

:

symptom WITH probability;

where problem-name is an alphanumeric name of a possible problem with an object of the class; description is a quoted free text string that describes the problem and/or associates an action with it (a programmed action or one intended to be presented to human operators); symptom is an alphanumeric name of an observable event specified by either an EVENT of IMPORT statement; and probability may be l (low) m (medium), or h (high).

EXPORT statement: groups sets of events into a single abstract event. Only events specified by an export statement are exported to the external world outside the class instance. A preferred syntax for this statement is:

Export aggregate-name MEANS description

IS event-name, . . . , event-name;

where aggregate-name is an alphanumeric name of an abstract problem exported by the object, description is a quoted free text string that describes the problem and/or associates an action with it (a programmed action or one intended to be presented to human operators); and event-name is an alphanumeric name of an event that is specified by an EVENT, IMPORT or PROBLEM statement.

END statement: terminates each definition block; each END statement should have a corresponding INTERFACE statement. A preferred syntax is:

END class-name;

where class-name is an alphanumeric name of the class being defined in the INTERFACE statement.

To summarize the foregoing syntax, GDME specification statements specify event knowledge associated with each object class (EVENT statements); the events that may occur in objects of the class and the symptoms that each such problem may cause (CAUSALITY statements); the events that may propagate to objects of the class from other related objects (IMPORT statements), and the events that can be externally observed in objects of the class (EXPORT statements). Other choices of syntax for specifying event and event propagation information may be equally suitable for this purpose.

Having described in detail syntax for various preferred GDME specifications, the operation and construction shown in the right half of FIG. 8 will now be described for an embodiment which uses a GDME formal event model. GDME statements comprising a plurality of the above statements are entered by a user into GDME compiler 808. The statements may be tailored for the particular system being monitored and the specific classes, attributes, probabilities and other parameters will be selected according to the particular type of system. GDME compiler 808, which may be constructed using the normal parsers and other well-known components in the software engineering field details of which are not provided here, generates event model 809 and propagation model 810 for each ESO class. These models are used by matrix generator 811 to analyze the events and causality associated with a specific domain described by the collection of entities and relationships stored in configuration specification 812.

Event model 809, for an embodiment using a formal GDME event model, is a data structure comprising, in various preferred embodiments, three things:

(1) A list of all events associated with a class. Each event has a name and a method (or procedure) to evaluate the expression specified by the EVENT statement to determine whether the event condition holds. This list and the required methods are generated by compiler 808 from the EVENT statements.

(2) A list of problems associated with a class. For each problem, a list of events it may cause is included, each specifying the probability of this causality. This list is generated by compiler 808 from the CAUSALITY statements.

(3) A list of aggregated events associated with a class. Each aggregate event has a name and a method to evaluate it. An aggregate event holds if any of the events it aggregates holds. This list is generated by compiler 808 from the EXPORT statements.

Propagation model 810 is a data structure comprising a list of all relationships associated with a class. It may additionally contain methods that are generated for determining the closure of the events that may propagate to other objects. This information may be generated by compiler 808 from the IMPORT statements.

Figure 9:
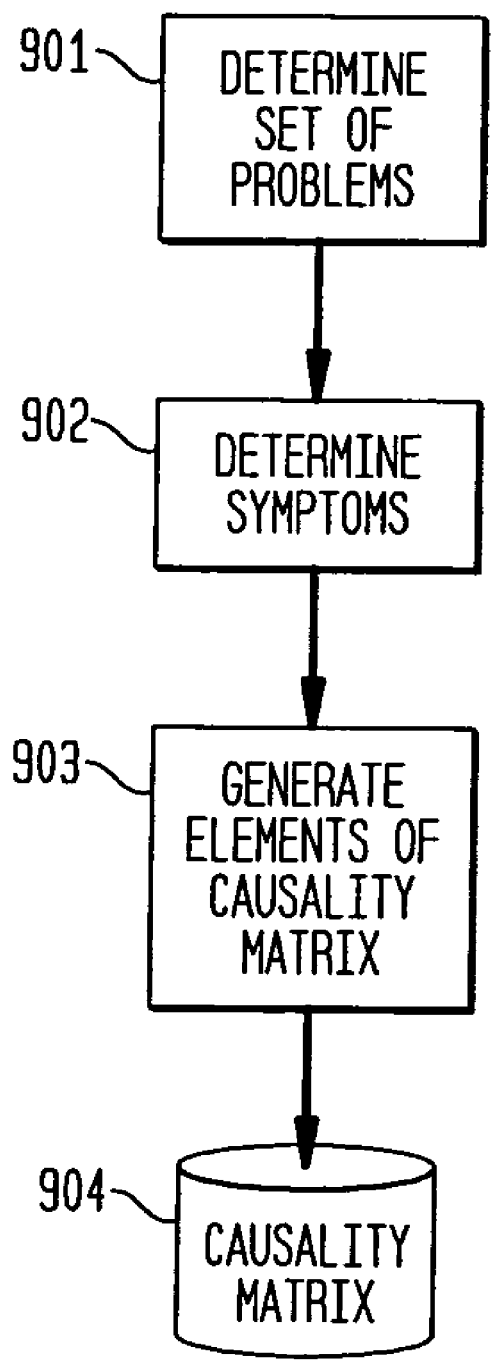
FIG. 9 illustrates steps used by matrix generator 811 of FIG. 8 to generate a causality matrix.

Matrix generator 811, which differs from matrix generator 806, generates causality matrix 807 from event model 809, propagation model 810, and configuration specification 812 using steps illustrated in FIG. 9. With reference to step 901 in FIG. 9, matrix generator 811 first determines the set of problems as the union of all the problems of all the ESOs in the domain. These are determined by the class of each ESO recorded in event model 809 and appearing in configuration specification 812 (FIG. 8). Next, at step 902, matrix generator 811 determines the set of symptoms in the domain as the union of all the symptoms of all the entities in the domain. Finally, at step 903, each element of the causality matrix is generated using the direct causality stored in event model 809, and using the indirect causality (events imported from other objects via relationships) by using the transitive closure of causality propagation using propagation model 810. The transitive closure may be determined via methods generated by compiler 808, or by other means. These methods encapsulate the event propagation model and use the configuration specification to infer the possible paths for propagation of events required in computing the closure. The resulting causality matrix 904 is used to generate an efficient codebook as described previously with relation to FIG. 1A.

SUMMARY

According to the above description, there is provided a method and apparatus for specifying, detecting and identifying exceptional events (such as problems) in a system having observable events. Although many of the examples contained herein relate to computer networks, it is expressly understood that such examples do not in any way limit the scope of the invention. Using the teachings contained herein, one of ordinary skill in the art will be able to practice the invention in any system which produces observable events. It is apparent that many modifications and variations of the present invention are possible in light of the above teachings, and references to specific values or paradigms are by way of example only. It is, therefore, to be understood that within the scope of the appended claims the invention may be practiced otherwise than as specifically described. As one example, the invention may be practiced by distributing the decoding process across a number of computers, such that a complex system domain is partitioned into smaller domains, each domain having a local event correlator. Event correlators for the different domains may operate concurrently and interact with one another to selectively import/export events from one another. Numbered steps in the appended method claims should not be considered as limiting the particular order in which the claimed steps are practiced.

What is claimed is:

1. A method, operable on a computer system, of managing a network including a plurality of types of network components, the method instructing the computer system to execute the steps of:

creating non-specific representations of selected ones of the plurality of network component types;

creating at least one configuration non-specific representation of problems associated with each of the selected ones of the plurality of network component types;

creating at least one configuration non-specific representation of symptoms associated with each of the created non-specific representations of problems;

creating configuration non-specific representation of relations along which the problems or symptoms propagate among the types of network components;

producing a data structure for determining a problem from the one or more symptoms by combining a plurality of said configuration non-specific representations of problems, symptoms and relationships based on information with respect to the configuration of the network components types, and determining a problem representation causing an occurrence of at least one symptom using the data structure.

2. The method as recited in claim 1, wherein the network is partitioned into a plurality of system domains, each of the system domains including a subset of instances of the network component types.

3. The method as recited in claim 2, instructing the computer system to further execute the step of:

producing a data structure for each of the system domains, each data structure determining the non-specific representations of problems causing an occurrence of at least one symptom within the associated system domain.

4. The method as recited in claim 3, instructing the computer system to further execute the step of:

combining the determined non-specific representations of problems in selected ones of the associated system domains into one or more causes affecting the network.

5. A computer-readable medium providing code for managing a plurality of types of network components by instructing a processor to execute the steps of:

creating non-specific representations of selected ones of the plurality of network component types;

creating at least one configuration non-specific representation of problems associated with each of the selected ones of the plurality of network component types;

creating at least one configuration non-specific representation of symptoms associated with each of the created non-specific representations of problems;

creating configuration non-specific representation of relations along which the problems or symptoms propagate among the types of network components;

producing a data structure for determining a problem from the one or more symptoms by combining a plurality of said configuration non-specific representations of problems, symptoms and relationships based on information with respect to the configuration of network components types, and determining a problem representation causing an occurrence of at least one symptom using the data structure.

6. The computer-readable medium as recited in claim 5, wherein the network is partitioned into a plurality of system domains, each of the system domains including a subset of instances of the network component types.

7. The computer-readable medium as recited in claim 5, providing further code for instructing the processor to execute the step of:

producing a data structure for each of the system domains, each data structure determining the non-specific representations of problems causing an occurrence of at least one symptom within the associated system domain.

8. The computer-readable medium as recited in claim 5, providing further code for instructing the processor to execute the step of:

combining the determined non-specific representations of problems in selected ones of the associated system domains into one or more causes affecting the network.

* * * * *